United States Patent
Tang et al.

(10) Patent No.: US 6,930,616 B2
(45) Date of Patent: Aug. 16, 2005

(54) METHOD AND APPARATUS FOR LWD SHEAR VELOCITY MEASUREMENT

(75) Inventors: Xiao Ming Tang, Sugar Land, TX (US); Tsili Wang, Katy, TX (US); Douglas J. Patterson, Houston, TX (US); James V. Leggett, III, Houston, TX (US); Vladimir Dubinsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 11 days.

(21) Appl. No.: 10/753,509

(22) Filed: Jan. 8, 2004

(65) Prior Publication Data

US 2004/0257911 A1 Dec. 23, 2004

Related U.S. Application Data

(63) Continuation-in-part of application No. 10/045,263, filed on Nov. 7, 2001, now Pat. No. 6,850,168.
(60) Provisional application No. 60/248,097, filed on Nov. 13, 2000, provisional application No. 60/438,932, filed on Jan. 9, 2003, and provisional application No. 60/462,358, filed on Apr. 11, 2003.

(51) Int. Cl.$^7$ .................................................. G01V 3/00
(52) U.S. Cl. .................. 340/854.4; 367/25; 367/75; 181/102; 181/122; 181/106; 702/6
(58) Field of Search .............................. 367/25, 26, 82, 367/31, 75; 181/104, 102, 106, 105, 122; 702/6; 340/854.4

(56) References Cited

U.S. PATENT DOCUMENTS

| | | | |
|---|---|---|---|
| 4,682,308 A | * | 7/1987 | Chung .......................... 367/31 |
| 4,685,091 A | | 8/1987 | Chung et al. .................. 367/31 |
| 4,832,148 A | * | 5/1989 | Becker et al. .............. 181/104 |
| 4,932,003 A | | 6/1990 | Winbow et al. ............... 367/75 |
| 4,951,267 A | | 8/1990 | Chang et al. .................. 367/31 |
| RE33,472 E | * | 12/1990 | Chung .......................... 367/31 |
| 5,027,331 A | | 6/1991 | Winbow et al. ............... 367/75 |
| 5,077,697 A | | 12/1991 | Chang .......................... 367/31 |
| RE33,837 E | * | 3/1992 | Chung et al. .................. 367/31 |
| 5,278,805 A | | 1/1994 | Kimball ........................ 367/32 |
| 5,510,582 A | | 4/1996 | Birchak et al. .............. 181/102 |
| 5,753,812 A | * | 5/1998 | Aron et al. ............... 73/152.47 |
| 5,796,677 A | | 8/1998 | Kostek et al. ................. 367/25 |
| 5,831,934 A | | 11/1998 | Gill et al. ...................... 367/25 |
| 5,852,262 A | | 12/1998 | Gill et al. .................... 181/106 |
| 5,852,587 A | | 12/1998 | Kostek et al. ................. 367/25 |
| 5,936,913 A | | 8/1999 | Gill et al. ...................... 367/25 |
| 5,971,095 A | | 10/1999 | Ozbek ........................ 181/112 |
| 6,082,484 A | | 7/2000 | Molz et al. .................. 181/102 |
| 6,084,826 A | | 7/2000 | Leggett, III .................. 367/82 |
| 6,366,531 B1 | | 4/2002 | Varsamis et al. ............. 367/26 |
| 6,552,962 B1 | | 4/2003 | Varsamis et al. ............. 367/25 |
| 6,631,327 B2 | * | 10/2003 | Hsu et al. ...................... 702/6 |

FOREIGN PATENT DOCUMENTS

EP            0778473 A2    6/1997

OTHER PUBLICATIONS

Chaur–Jian Hsu et al.; *Mandrel effects on the dipole flexural mode in a borehole*, J. Acoust. Soc. Am., vol. 104 No. 4, Oct. 1998, pp. 2025–2039, 11 Figs.

(Continued)

*Primary Examiner*—Albert K. Wong
(74) *Attorney, Agent, or Firm*—Madan, Mossman & Sriram, P.C.

(57) ABSTRACT

Array quadrupole data obtained in a LWD environment are processed to determine the shear velocity of an earth formation taking into account dispersion effects caused by the logging tool. When this processing is done in an azimuthally anisotropic formation, the shear velocity that is obtained is the slow shear velocity. When 4C (cross-dipole) data are also obtained, then both the fast and slow shear velocities of an azimuthally anisotropic formation can be obtained.

33 Claims, 22 Drawing Sheets

OTHER PUBLICATIONS

V. N. Rama Rao et al.; *Acoustics of fluid–filled boreholes with pipe: Guided propagation and radiation,*, J. Acoust. Soc. Am., vol. 105, No. 6, Jun. 1999, pp. 3057–3066, 15 Figs.

S. T. Chen; *Shear–wave logging with quadrupole sources*, Geophysics, vol. 54, No. 5, May 1989, pp. 590–597, 14 Figs.

Andrew L. Kurkjian et al.; *Acoustic multipole sources in fluid–filled boreholes*, Geophysics, vol. 51. No. 1, Jan. 1986, pp. 148–163, 24 Figs., 3 Tables.

V. N. Rama Rao et al.; *Models in LWD Applications*, MIT Earth Resources Laboratory Annual Report 1999, pp. 5–1–5–14, 6 Figs.

* cited by examiner

Time (ms)

METHOD AND APPARATUS FOR LWD SHEAR VELOCITY MEASUREMENT

CROSS REFERENCES TO RELATED APPLICATIONS

This application is a continuation in part of U.S. patent application Ser. No. 10/045,263 filed on Nov. 7, 2001, now U.S. Pat. No. 6,850,168 with a priority claim to U.S. Provisional Patent Application Ser. No. 60/248,097 filed on Nov. 13, 2000. This application also claims priority from U.S. Provisional Patent Application Ser. No. 60/438,932 filed on Jan. 9, 2003 and from U.S. Provisional Application Ser. No. 60/462,358 filed on Apr. 11, 2003.

FIELD OF THE INVENTION

This invention generally relates to a method and apparatus for measuring and processing a characteristic of subsurface earth formations penetrated by a borehole. More specifically this invention relates to a method and apparatus for measuring and processing an acoustic characteristic such as formation shear wave velocity of subsurface sonic waves after these waves traverse earth formations adjoining a borehole or passing through a portion of the subsurface.

BACKGROUND OF THE INVENTION

To obtain hydrocarbons such as oil and gas, wellbores (also referred to as the boreholes) are drilled by rotating a drill bit attached at the end of a drilling assembly generally referred to as the "bottom hole assembly" (BHA) or the "drilling assembly." The wellbore path of such wells is carefully planned prior to drilling such wellbores utilizing seismic maps of the earth's subsurface and well data from previously drilled wellbores in the associated oil fields. Due to the very high cost of drilling such wellbores and the need to minimize time actually spent drilling and wireline logging wells, it is essential to gain as much information as possible during drilling of the wellbores. Information about downhole conditions and materials may be acquired with wireline tools or bottom hole assemblies (BHA). Wireline tools are generally used after a wellbore is drilled, bottom hole assemblies may be used while the well is being drilled as part of the drilling string. Downhole wellbore information acquired from BHA components may be utilized, among other things, to monitor and adjust the drilling direction of the wellbores or to detect the presence of geologic formations and hydrocarbons.

In logging while drilling through an earth formation, it is desirable to measure formation shear wave velocity. The shear wave velocity of earth formations provides information important for exploration and production of oil and gas from the formation. The shear wave velocity profile enables the conversion of seismic shear wave time sections to depth sections and is utilized in the interpretation of seismic wave amplitude variation versus detector offset. The ratio between the shear wave velocity and the compressional wave velocity is closely related to the rock lithology and is related to hydrocarbon saturation. Shear wave velocity is also used to evaluate the mechanical properties of the formation in reservoir engineering applications.

Because of the importance of earth formation shear velocity, various methods have been developed to measure it. In conventional wireline logging using a monopole acoustic tool, the shear velocity can be measured from the shear wave refracted along the borehole wall if the formation shear wave velocity is greater than the borehole fluid acoustic velocity. A formation that has a shear wave velocity faster than the borehole fluid is called a 'fast formation.' However, in a formation where the shear velocity is slower than borehole fluid velocity, a 'slow formation,' the shear wave can no longer refract along the borehole wall, and the shear velocity cannot be directly measured from monopole logging. Because of the need to measure shear velocity in slow formations, especially in the soft sediments of deep-water reservoirs, dipole acoustic logging tools were developed. The dipole tool induces and measures the bending or flexural wave motion in the formation. In a sufficiently low frequency range (1–3 kHz), the flexural wave travels at the shear velocity of the formation, regardless whether the formation is fast or slow. This allows for direct measurement of formation shear velocity using the dipole acoustic tool. Dipole acoustic logging is now a mature technology with worldwide commercial applications.

An alternative technique for shear wave velocity measurement is using the quadrupole shear waves. A quadrupole acoustic tool induces and measures the quadrupole shear wave in the formation. The low-frequency portion of the wave travels at the formation shear wave velocity, allowing for direct shear velocity measurement from the quadrupole wave. Although the quadrupole shear wave has been extensively studied theoretically and a wireline quadrupole-logging tool was also proposed (in U.S. Pat. No. 5,027,331 to Winbow et al.), this technology has not yet been commercially applied to the oil and gas industry. This is largely because the wide acceptance and success of the dipole shear wave technology have fulfilled the needs for measuring shear velocity in slow formations.

The acoustic Logging-While-Drilling (LWD) technology has been developed in recent years out of the needs for saving rig-time and for real-time applications such as geosteering and pore pressure determination, among others. The LWD acoustic technology is aimed at measuring the compressional- and shear-wave velocities of an earth formation during drilling. This technology has been successful in the measurement of compressional wave velocity of earth formations. The need for determining the shear wave velocity in slow formations calls for further development of the technology for shear wave measurement capability. Because of the popularity and success of the dipole shear wave technology in wireline logging, this technology is naturally extended to the LWD situation and a LWD dipole acoustic tool has been built and offered for commercial applications. The application of the dipole acoustic technology to LWD has a serious drawback caused by the presence of the drilling collar with BHA that occupies a large part of the borehole. The drawback is that the formation dipole shear wave traveling along the borehole is severely contaminated by the dipole wave traveling in the collar.

U.S. patent application Ser. No. 10/045,263 of Tang et al, having the same assignee as the present application and the contents of which are fully incorporated herein by reference, teaches the use of quadrupole LWD tool for determination of shear velocities of earth formations. The advantage, as taught in Tang, is that the quadrupole wave, when excited at low frequencies, travels at the formation shear velocity and is free of the tool (quadrupole) wave contamination. The LWD quadrupole waves, however, can be quite dispersive. The typical dispersion characteristic is that, as frequency increases, the quadrupole velocity departs from the value of formation shear velocity and monotonically decreases with frequency. The degree of dispersion, or the departure from the formation shear velocity, of the measured quadrupole wave velocity depends on the measurement frequency range, drilling mud used, and drill collar and borehole sizes. When there is a significant dispersion effect in the measured data, a dispersion correction procedure is needed.

Shear wave velocity measurements have also been used for determination of azimuthal anisotropy in earth formations. Such azimuthal anisotropy may be indicative of stress distributions in the earth or of fracturing in the earth. In either case, knowledge of the anisotropy is important for reservoir development. U.S. Pat. No. 4,832,148 to Becker et al. teaches the use of cross-dipole acoustic logging for determination of the direction and extent of azimuthal anisotropy. Such cross-dipole measurements are commonly referred to as 4C (for four component) data, the four components being called xx, xy, yx, and yy. The first and second letters refer to the source and receiver orientation respectively in a Cartesian system wherein the z-axis is vertical (or perpendicular to bedding).

For example, xy means emitting a dipole wave from the x-direction source and recording the wave using the y-direction dipole receiver. This indicates that the dipole measurement is a directional measurement and that is why it allows for measuring azimuthal shear velocity changes of the formation. The 4C measurement logging, is now a mature technology in wireline logging. The LWD 4C dipole measurement, however, has two important issues that must be solved. The first is that the LWD dipole, as discussed above, does not directly measure formation shear velocity because of the drill-collar interference. The second is that the rotation of the tool during drilling obscures the directionality of the dipole measurement. (Because of the drill-bit rotation, the dipole source/receiver does not point to a fixed azimuth.)

There is a need for a method of determination of shear wave velocities of earth formations that is relatively robust in the presence of tool mode waves propagating along the drill collar. The need is particularly acute in situations where the formation shear velocity is less than the velocity of propagation of compressional waves in borehole fluids. There is also a need to determine the shear-wave anisotropy azimuthal with respect to the borehole, as this information is important for detecting formation fracture system and characterizing ambient stress field. Such an invention should account for the dispersive nature of the acoustic signals in the LWD environment. Such an invention should also preferably be able to determine azimuthal anisotropy in LWD measurements. It is further desirable that such a method should account for the presence of a drill collar within the borehole, the type of drilling mud used, the size of the borehole, and eccentricity of the logging tool within the borehole. The present invention satisfies this need.

SUMMARY OF THE INVENTION

The present invention is a method and apparatus for using an acoustic logging tool conveyed in a borehole in an earth formation for determining a formation shear velocity. The logging tool has at least one source and a plurality of receivers. The source and receivers generate and receive quadrupole wave data. The quadrupole wave data are dispersive. A slowness of the array quadrupole wave data is obtained. Using a measured slowness of the array quadrupole wave data and other known parameters of the logging tool, borehole and borehole fluid, the slowness is estimated and compared to the actual measured slowness. The formation shear velocity (slowness) is altered until a match is obtained. The diameter of the borehole may be obtained using a suitable caliper device.

The estimation of formation slowness that would be measured with a quadrupole array tool is based on a weighted spectral averaging of the dispersion relation for the quadrupole wave for specified values of the tool, borehole, and borehole parameters based on a selected value of the formation shear wave slowness.

When the formation is azimuthally anisotropic, the quadrupole array data is responsive primarily to the slow shear wave velocity. For such an azimuthally anisotropic formation, in an optional embodiment of the invention, cross-dipole (4C) shear data are also be obtained. During rotation of the logging tool in a logging while drilling environment, orientation sensors on the tool are used to monitor the toolface angle. Using the measured toolface angle, the cross-dipole data are rotated to a fixed coordinate system. Prior art methods are used to determine the principal direction of azimuthal anisotropy from the cross-dipole data in the fixed coordinate system. The cross-dipole data are then rotated to the principal directions. Subsequent processing of the quadrupole data and the cross-dipole data in the principal direction using a weighted spectral averaging makes it possible to recover the magnitude of the azimutal anisotropy of the formation.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention, and wherein:

FIGS. 15a, 15b and 15c show examples of quadrupole waveforms for eccentering of a tool (a) centralized, (b) in contact with the formation, and (c) half way between;

FIGS. 16a, 16b and 16c show quadrupole waveforms for three different borehole sizes: (a) 8.5 in, (b) 9.5 in, and (c) 12.25 in;

DETAILED DESCRIPTION OF THE INVENTION

The present invention is a method, system and apparatus for measuring shear wave formation velocities while a well is being drilled. To the extent that the following description is specific to a particular embodiment or a particular use of the invention, this is intended to be illustrative and is not to be construed as limiting the scope of the invention.

Figure 1A:
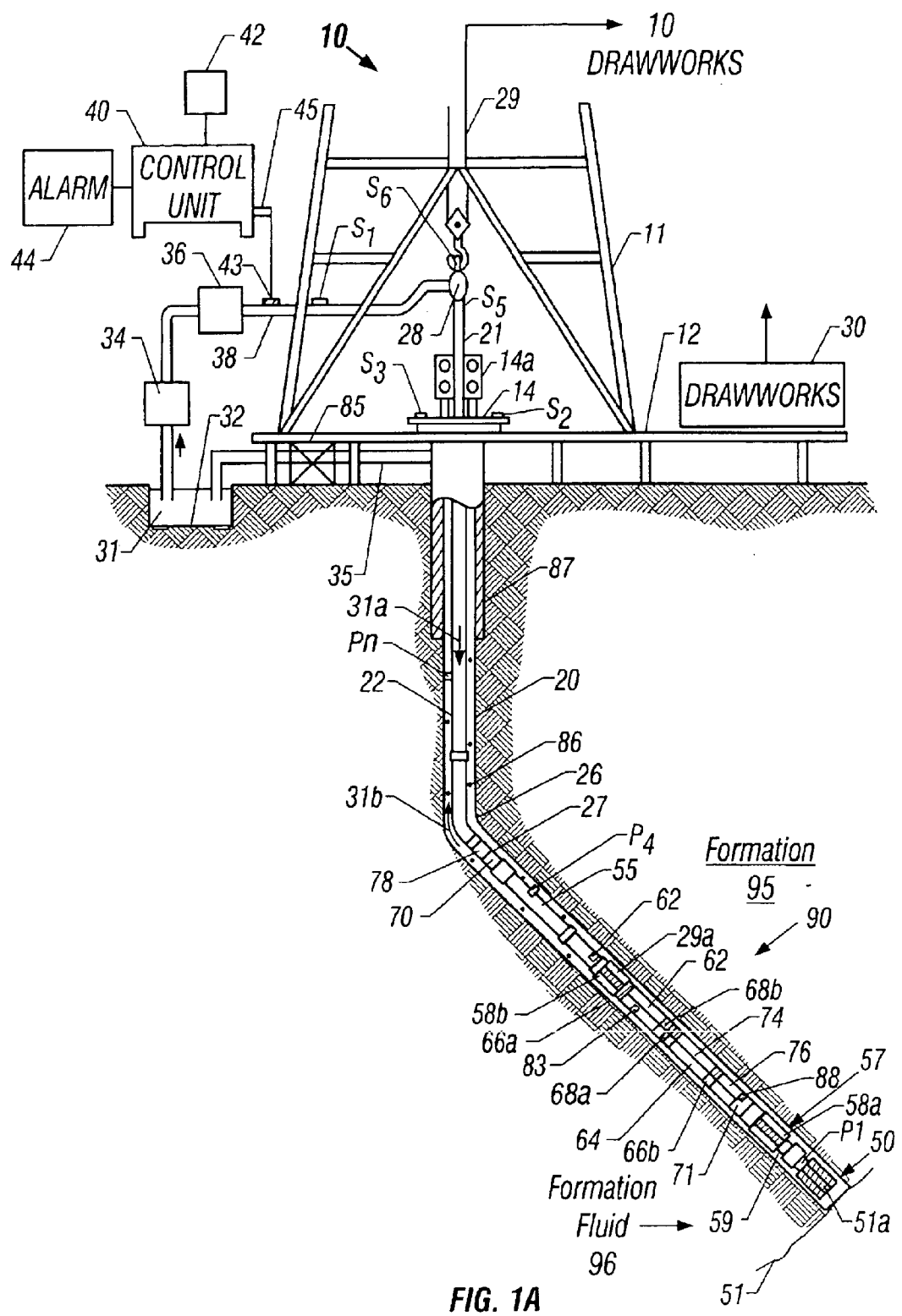
FIG. 1A shows a schematic diagram of a drilling system that employs the apparatus of the current invention in a logging-while-drilling (LWD) embodiment.

FIG. 1A shows a schematic diagram of a drilling system 10 having a bottom hole assembly (BHA) or drilling assembly 90 that includes sensors for downhole wellbore condition and location measurements. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill-cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications only rotating the drill pipe 22 rotates the drill bit 50. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1A shows an example resistivity-measuring device 64 in BHA 90. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity-measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity-measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a significant portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized a rotary table does not rotate the tubing; instead it is injected into the wellbore by a suitable injector 14a while the downhole motor 55 rotates the drill bit 50.

Figure 1B:
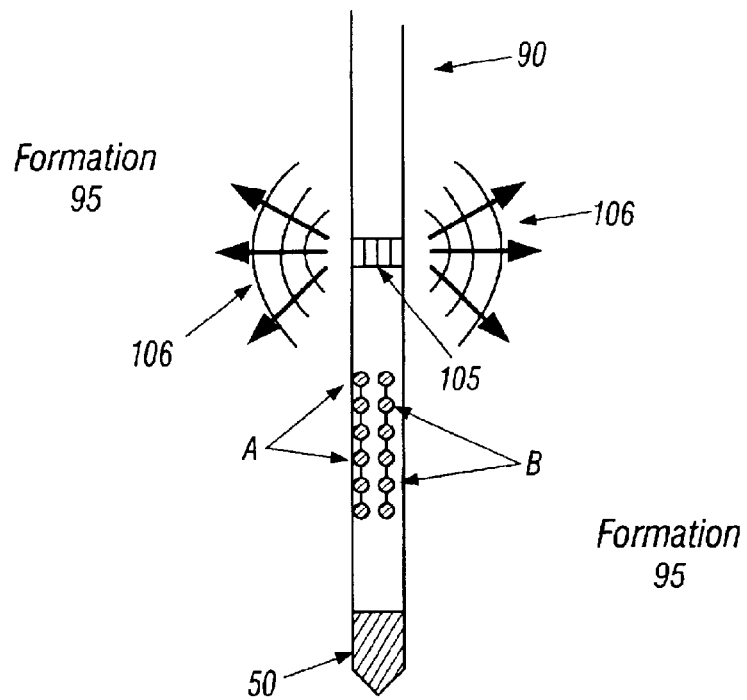
FIG. 1B illustrates a LWD tool on a drill collar.

FIG. 1B is a schematic view of an acoustic logging while drilling tool system on a BHA drill collar 90 containing a drill bit 50. This system is mounted on the BHA drill collar 90 for performing acoustic measurements while the formation is being drilled. The acoustic logging while drilling tool system has a source 105 to emit acoustic vibrations 106 that may traverse formation 95 and may also be propagated along the borehole wall and be received by sensors A and B which may be in arrays. These sensors are discussed later in the application. A point to note is that the sensors are disposed between the transmitter and the receiver. This has important benefits in that the desired signal produced by the transmitter travels in a direction opposite to the direction of noise generated by the drillbit 50. This makes it possible to use suitable filtering techniques, including phased arrays, to greatly reduce the drillbit noise. In an alternate embodiment of the invention, the transmitter 105 may be located between the sensors and the drillbit 50.

The application of the dipole acoustic technology to LWD has a serious drawback caused by the presence of the drilling collar with BHA that occupies a large part of the borehole. The drawback is that the formation dipole shear wave traveling along the borehole is severely contaminated by the dipole wave traveling in the collar.

Discussed first is a summary of the methods used for analysis of wave propagation for a transversely isotropic (TI) medium. For the sake of generality, we consider acoustically anisotropic formations although much of our study was done for isotropic formations. The elastic stiffness tensor of a TI medium is given by $$C = \begin{bmatrix} C_{11} & C_{12} & C_{13} & & & \\ & C_{11} & C_{13} & & & \\ & & C_{33} & & & \\ & & & C_{44} & & \\ & & & & C_{44} & \\ & & & & & C_{66} \end{bmatrix} \quad (1)$$

where $C_{12}=C_{11}-2C_{66}$. The tensor is symmetric and only half of it is displayed. We assume the borehole makes an angle α with respect to the symmetry axis of the TI medium. Two finite-difference approaches can be used to simulate the wave propagation in a TI medium. In the first method, the model is discretized in the x-, y-, and z-coordinates. In the second method, the model is discretized in a rotated Cartesian coordinates such that the rotated z-axis coincides with the borehole axis. The first method is easier because it does not rotate the TI tensor but is difficult to model the tool body and a deviated well. The second method is able to accurately model the tool body and a deviated well but must rotate the TI tensor. We chose the second approach.

Using the rotation equation (Auld, 1973)

$$C' = R\, C\, R_T$$

where R is the rotation matrix given by $$R = \begin{bmatrix} \cos^2\alpha & 0 & \sin^2\alpha & \sin 2\alpha & 0 & 0 \\ 0 & 1 & 0 & 0 & 0 & 0 \\ \sin^2\alpha & 0 & \cos^2\alpha & -\sin 2\alpha & 0 & 0 \\ 0 & 0 & 0 & \cos\alpha & 0 & -\sin\alpha \\ -\sin\alpha\cos\alpha & 0 & \sin\alpha\cos\alpha & 0 & \cos 2\alpha & 0 \\ 0 & 0 & 0 & \sin\alpha & 0 & \cos\alpha \end{bmatrix} \quad (2)$$

the new stiffness tensor becomes $$C = \begin{bmatrix} C'_{11} & C'_{12} & C'_{13} & & C'_{15} & \\ & C'_{22} & C'_{13} & & C'_{25} & \\ & & C'_{33} & & C'_{35} & \\ & & & C'_{44} & & C'_{46} \\ & & & & C'_{44} & \\ & & & & & C'_{66} \end{bmatrix} \quad (3)$$

In our analysis, the TI medium is defined using $C_{11}$, $C_{66}$, and the Thomsen (1986) parameters $$\varepsilon = \frac{C_{11} - C_{33}}{2C_{66}} \quad (4)$$

$$\gamma = \frac{C_{66} - C_{44}}{2C_{44}}$$

$$\delta = \frac{(C_{13} + C_{44})^2 - (C_{33} - C_{44})^2}{2C(C_{33} - C_{44})}$$

The parameter δ has large variations for sedimentary and crystalline rocks. In some of the modeling results, a special case of δ=ε is chosen. We used a nonuniform finite-difference grid to cover the model differently with smaller grid sizes for the tool body, transmitter and receivers, and borehole and larger grid sizes for the remote formation. The grid size ranges from 6 mm to 12 mm.

First, the dipole wave excitation and propagation characteristics for a borehole with a drilling collar are analyzed. Except where noted otherwise, the results are for a drill collar centered within the borehole. Using known analyses methods, for example the analyses of the type described in Schmitt (1988), one can calculate the velocity dispersion curve for the formation and collar dipole shear (flexural) waves. The dispersion curve describes the velocity variation of a wave mode with frequency. In the example, the borehole diameter is 23.84 cm and the inner- and outer diameter of the collar is 5.4 and 18 cm. respectively. The inner collar column and the annulus column between the collar and borehole are filled with drilling mud whose acoustic velocity and density are 1,470 m/s and 1 g/cc, respectively. The collar is made of steel (compressional velocity, shear velocity and density of steel are 5,860 m/s, 3,130 m/s, and 7.85 g/cc, respectively). The formation is acoustically slow with compressional velocity of 2,300 m/s, shear velocity 1,000 m/s, and density 2 g/cc. It is to be noted that the example is for illustrative purposes only and not intended to be a limitation on the scope of the invention.

Figure 2:
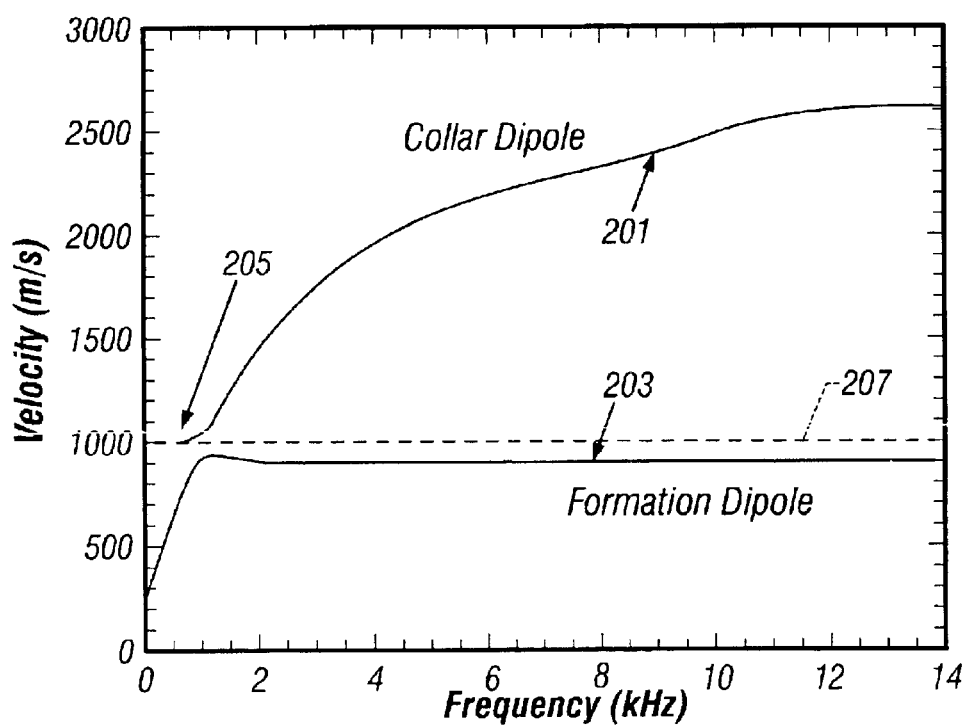
FIG. 2 illustrates velocity dispersion curves for formation and drill-collar dipole modes.

The calculated drilling collar and formation flexural wave dispersion curves for dipole modes are shown in FIG. 2, for the frequency range shown as the horizontal axis of 0 to 14 kHz. The collar dipole wave dispersion curve 201 displayed along the vertical axis shows how velocity of the collar dipole wave varies with frequency over the range 0 to 14 kHz. The formation dipole wave dispersion curve 203 shows that except for low frequencies in this range, there is relatively little change in velocity. The formation and collar flexural wave modes coexist almost for the entire frequency range, except at the very low frequency where the collar flexural mode appears to terminate at the formation shear velocity. Below the frequency where the collar mode terminates, the formation flexural mode velocity appears to continue the collar flexural mode behavior that would exist in the absence of the formation, the velocity decreasing to zero at the zero frequency. This cross-over phenomenon is caused by the strong acoustic interaction between the collar and the formation in this dipole excitation situation.

Figure 3:
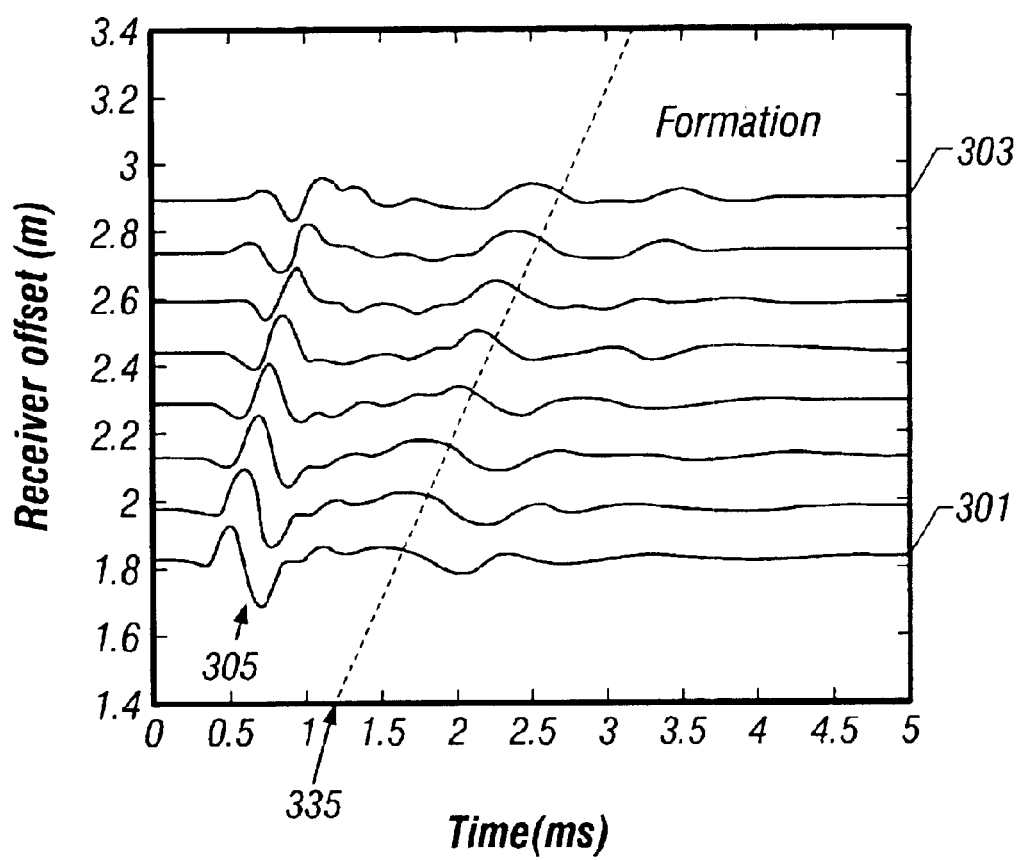
FIG. 3 illustrates dipole acoustic waveforms in the presence of a drilling collar.

Dipole acoustic wave propagation in a borehole with a drilling collar may be simulated with numerical finite difference techniques, for example as described in Cheng et al. (1995). The model parameters are the same as used in the above velocity dispersion calculation example. The dipole source and an array of receivers are placed on the rim of the collar. The source excitation center frequency is 2 kHz. FIG. 3 shows the simulated dipole acoustic waveforms displayed with time along the horizontal axis. Dipole acoustic waveforms are displayed by offset corresponding to source-receiver distance along the vertical axis in FIG. 3. Receiver locations are spaced 0.1524 m apart beginning with the near trace waveform at 1.833 m 301 to 2.9 m 303 offset from the source. The dipole acoustic waveforms are dominated by the collar flexural wave that has a faster velocity and a dispersive character. The initial strong impulses 305 of the dispersive collar flexural wave are followed in time by dispersive energy that is stronger than the flexural wave of interest representing the formation S-wave. The dashed line 335 represents the arrival location and velocity of the formation flexural wave. The formation flexural wave of interest, aligned with line 335, is smaller in amplitude compared with the collar flexural wave, and is severely contaminated by the interaction of the collar flexural wave.

The above velocity dispersion calculation and wave propagation simulation results demonstrate that there is a strong interaction between formation and drilling collar flexural waves. The fundamental cause of this is that the two wave modes coexist in the same frequency range of interest. There are several drawbacks of the LWD dipole technology for shear velocity measurement. The first is the difficulty in obtaining good quality formation flexural wave measurements in the presence of severe contamination from the collar flexural wave. The collar wave, being a low-frequency mode, is difficult to suppress using attenuation techniques such as cutting grooves and/or inserting absorptive materials in the collar, etc. The second drawback is that the formation flexural wave, even if it could be reliably measured, cannot yield accurate formation shear velocity information because of the collar interaction. As can be seen from FIG. 2, the high frequency limit of the collar mode approaches the shear velocity of the collar and at the frequency 205 where the collar dipole mode ceases to exist, the velocity of the collar dipole mode is the formation shear velocity 207. The velocity 203 of the formation dipole mode is, at all frequencies, below the formation shear velocity 205. In the absence of a collar, when excited at low frequencies, the formation dipole mode would propagate at a velocity equal to the formation shear velocity. Determination of the formation shear velocity from the dispersion curves of either the formation dipole mode or the collar dipole mode not an easy matter. In addition, during drilling operations, there is a strong dipole mode excited by the drillbit that produces additional noise. For the foregoing reasons, it is difficult, if not impossible, to directly measure formation shear wave velocity using the dipole acoustic technology in the LWD environment.

One manner of deploying certain sensors for LWD shear wave data acquisition, for example in drill string BHA 90 of FIGS. 1A and 1B will now be described. The actual BHA utilized for a particular application may contain some or all of the sensors described in the background section, in addition to the present invention. For the purpose of this invention any such BHA could contain one or more seismic sources and receivers (collectively represented herein by numeral 88) at a suitable location in the BHA 90.

Figure 4A:
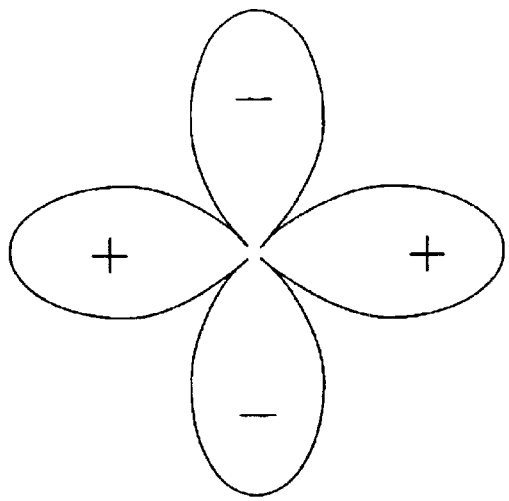
FIG. 4A shows is a schematic illustration of the field for a quadrupole wave.

This invention incorporates a quadrupole acoustic technology for the LWD shear velocity measurement. FIG. 4a shows an illustration of a quadrupole field. It shows a characteristic four-lobed pattern that may be substantially characterized by a $\cos 2\theta$ azimuthal variation. In the present instance, the field may be associated with particle motion or with pressure. The greatest advantage of using the quadrupole wave is that the collar quadrupole wave exists only above a certain frequency called the cut-off frequency. This frequency depends on the drilling collar thickness and borehole size. Thus, by determining the cut-off frequency for the collar and borehole dimensions, one can select a frequency band in which only the formation quadrupole shear wave is excited. Determining the velocity of the formation quadrupole wave will fulfill the needs for shear wave velocity measurement in the LWD environment. This is different from the situation in wireline logging: while Winbow does discuss the use of quadrupole logging on a wireline device, there is no discussion of a cutoff frequency of a quadrupole wave. Winbow teaches a wireline logging device. As would be known to those versed in the art, the tool diameter in wireline devices is typically much smaller than the borehole diameter. Chen has also discussed the use of a quadrupole source for shear wave logging and shows a comparison of experimental results with theoretical dispersion curves for Stoneley waves within the borehole. The tool diameter Chen's model is less than half the borehole diameter. As would be known to those versed in the art, Stoneley waves are interface waves propagating along the wall of the borehole. In contrast, the present invention deals with a MWD device wherein the diameter of the drill collar is almost the same as the diameter of the borehole. In such a case, the collar mode becomes important. This collar mode is different from the Stoneley waves discussed in *Chen*.

Figure 4B:
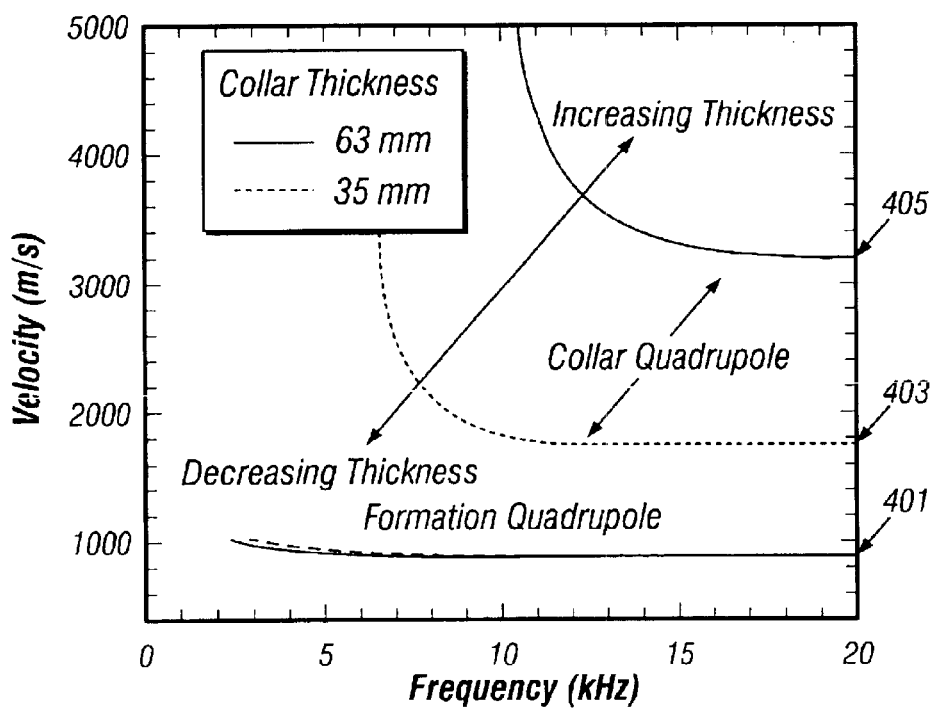
FIG. 4B illustrates velocity dispersion curves for formation and drill-collar quadrupole modes.

The feasibility of determining formation shear velocity from quadrupole wave measurement is demonstrated using theoretical/numerical analysis examples. The actual implementation may be done using a downhole processor at any suitable location in the bottom hole assembly. FIG. 4b shows the velocity dispersion curves of the formation 401 and collar quadrupole waves 403 and 405. Velocity in meter per second (m/s) is displayed along the vertical axis and frequency in kilohertz (kHz) along the horizontal axis. The velocity dispersion curve for an exemplary collar of thickness 35 mm is shown as curve 403. The velocity dispersion curve for an exemplary collar of thickness 63 mm is shown as curve 405. The formation quadrupole wave is slightly dispersive and reaches the formation shear wave velocity at a low cut-off frequency (around 2 kHz in this case). This indicates that formation shear wave velocity can be determined as the low frequency limit of the velocity of formation quadrupole waves. The collar quadrupole wave velocity curve shows very high values due to the high shear rigidity (steel) and thick wall (63 mm) of the drilling collar. The collar wave for the 63 mm thick collar 405, however, exists only in the frequency range above 10 kHz; whereas, the required frequency for shear velocity measurement of the formation is around 2 kHz, well separated from the frequency range (>10 kHz) of the collar wave. This frequency separation allows for designing a method and apparatus to generate quadrupole waves only in a predetermined frequency band (0–10 kHz in this case). In this band, only the formation quadrupole wave is generated. This wave excitation/generation scheme may be demonstrated using finite difference simulations.

Figure 5A:
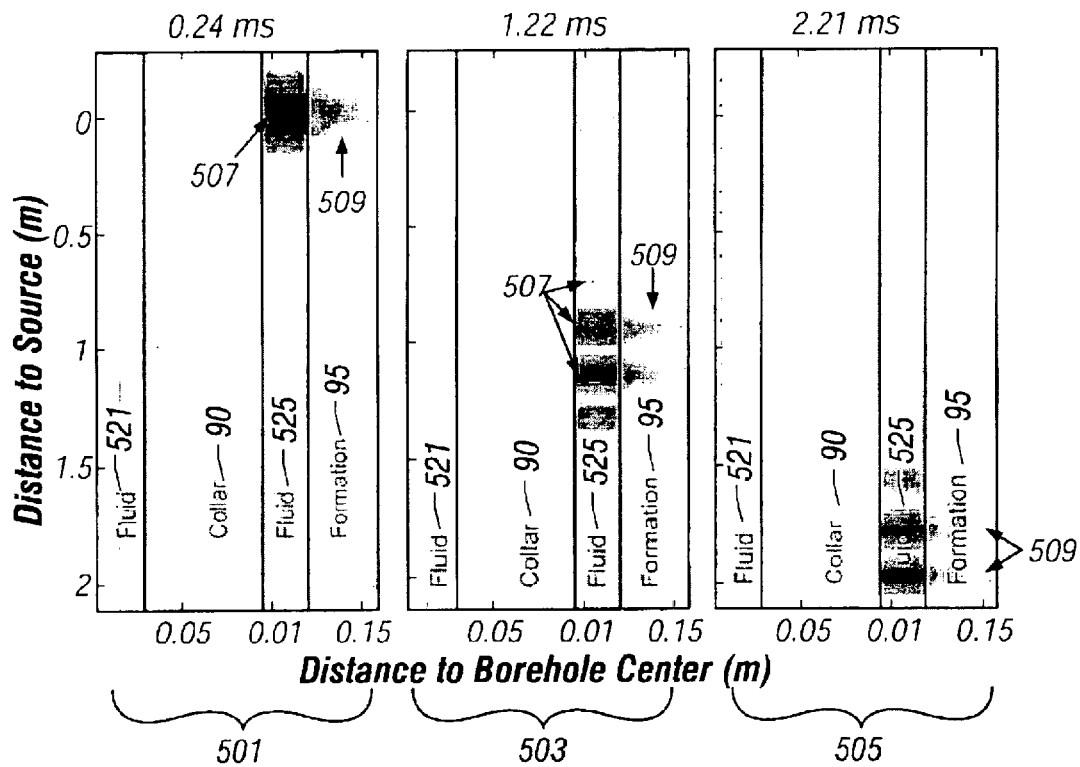
FIG. 5A illustrates wavefield snapshots of acoustic energy near the borehole, where radial particle velocity associated with the quadrupole wave motion is displayed.

In a finite difference modeling, a quadrupole source and an array of receivers with a 0.1524 m. spacing are placed at the rim of the collar. The source wavelet center frequency is chosen to be 2 kHz, the amplitude spectrum of the source wavelet diminishing to zero at about 5 kHz, which is below 10 kHz, the cut-off frequency of the collar quadrupole wave. FIG. 5a shows three snapshots in time of the wavefield intensity due to the quadrupole source. Each snapshot, 501, 503, and 505 is a cross-section displaying a fluid inside the drill collar 521, the drill collar 90, fluid 523 outside the drill collar, and a formation 95. Radial particle velocity associated with the quadrupole wave motion is displayed shaded 507, 509. These FIG. 5a snapshots display the locations of wavefield intensity at several instants of time (0.24 milliseconds for 501, 1.22 milliseconds for 503, and 2.21 milliseconds for 505, respectively). In the borehole fluid annulus high wavefield intensity is seen 507 and high wavefield intensity is seen in the formation 509. The wave motion in the fluid annulus and the motion in the formation are in phase, traveling at the formation shear velocity as demonstrated by the juxtaposition of high wavefield intensity in the fluid 507 and the formation 509 for all three snapshots 501, 503 and 505. This is the formation quadrupole wave as discussed in connection with FIG. 4. There is almost no discernable wave intensity for locations anywhere inside the collar except for the initial time (snapshot 0.24 ms 501) around the source, showing that the collar quadrupole wave is not excited in this frequency band for this collar thickness (2.48 inches).

Figure 5B:
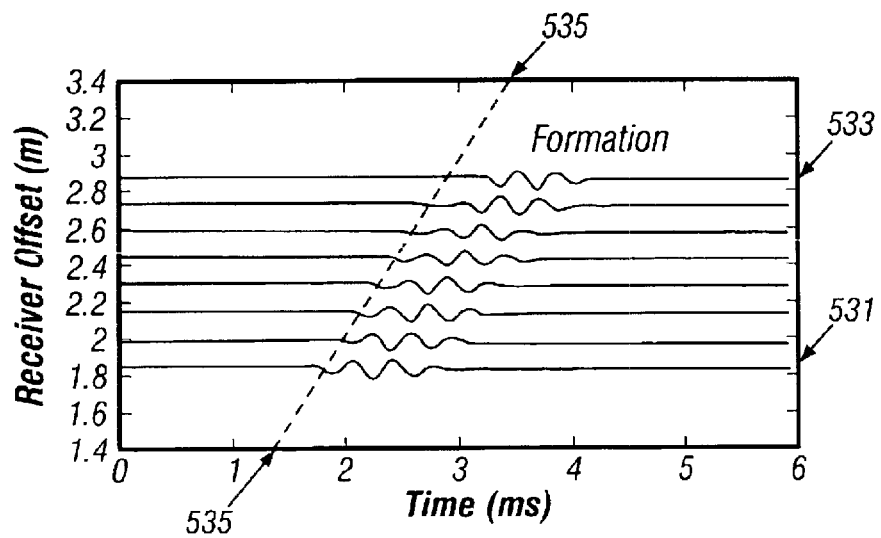
FIG. 5B illustrates quadrupole waveforms at various offsets.

The time-domain quadrupole waveforms of the receiver array are displayed in FIG. 5B where time is represented along the horizontal axis. Quadrupole acoustic waveforms are displayed by offset corresponding to source-receiver distance along the vertical axis in FIG. 5B. Receiver locations are spaced 0.1524 m apart beginning with the near trace waveform at 1.833 m 531 to 2.9 m 533 offset from the source. FIG. 5B shows only one wave, the formation quadrupole wave, traveling across the array at the formation shear velocity. The dashed line 535 marks the formation quadrupole wave first arrival. This time-domain wave simulation result is consistent with the frequency domain dispersion analysis result of FIG. 4. These examples demonstrate that choosing an appropriate wave excitation frequency band can eliminate collar quadrupole waves.

The excitation frequency band should be selected based on the drilling collar and borehole dimensions. In drilling practice, the size of the borehole is varied to suit exploration/ production needs and/or geological environment of the well to be drilled. Accordingly, the size of the drilling collar also varies. The change of the collar and borehole dimensions, especially the former, will significantly change the collar quadrupole wave characteristics. This, again, can be demonstrated using theoretical/numerical analysis examples. The quadrupole dispersion curves for a 35 mm thickness drilling collar (dashed curves) are shown in FIG. 4. With the thinner collar, the formation quadrupole dispersion curve (dashed line 403) is also changed. The cut-off frequency of the formation mode is raised to about 3 kHz and the whole curve exhibits higher values compared to the thick collar case (solid curve 405). The curve approaches the formation shear wave velocity at low frequencies. On the other hand, the collar quadrupole wave velocity is much reduced compared to the thick collar case (solid curve 405) and shows a much lower cut-off frequency (about 6 kHz). The general trend shown in FIG. 4 is that increasing the collar thickness will move the frequency band of the collar quadrupole wave away from that of the formation quadrupole wave. When the frequency band of the collar quadrupole wave is close to that of the formation quadrupole, measurement of the formation quadrupole wave will be severely impaired, as the following wave simulation example demonstrates.

Figure 6A:
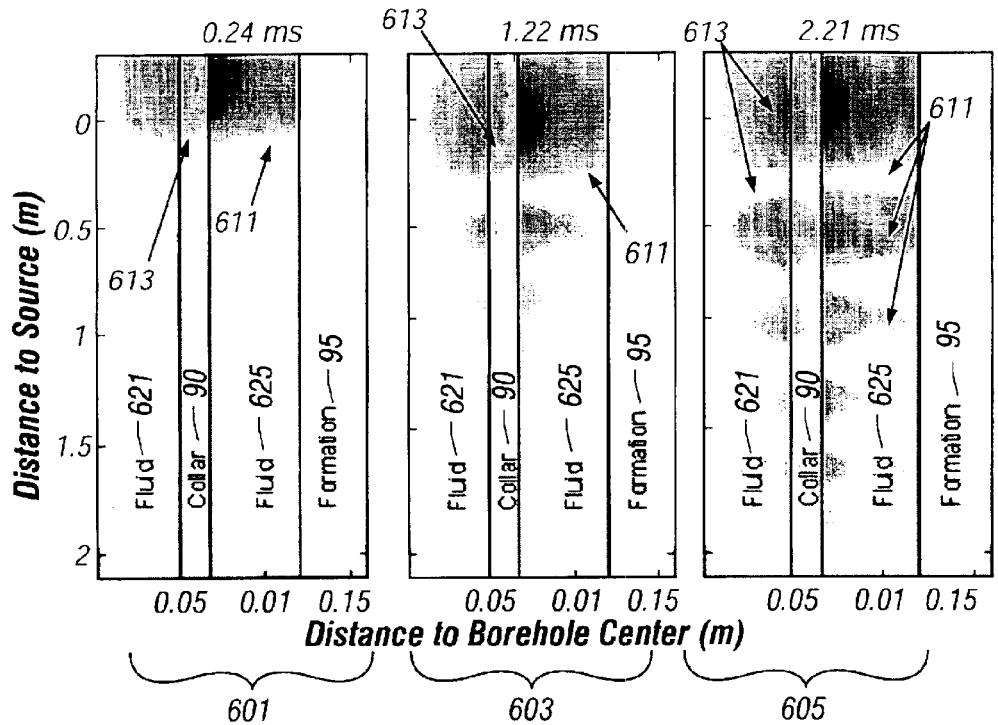
FIG. 6A illustrates wavefield snapshots of acoustic energy near the borehole, where radial particle velocity associated with the quadrupole wave motion in a thin-collared pipe is displayed.

The example case is where the collar pipe is relatively thin (thickness is only 16 mm or 0.63 inches). The cut-off frequency of the collar quadrupole wave is now about 3.5 kHz. Other parameters, as used in the simulation of FIG. 5B, are kept unchanged. With the 2 kHz center excitation frequency, both formation and collar quadrupole waves are excited. FIG. 6A is the counterpart of FIG. 5A, showing the wavefield snapshots for the 16 mm thick collar case. FIG. 6A shows three snapshots in time of the wavefield intensity due to the quadrupole source. Each snapshot, 601, 603, and 605 is a cross-section displaying a fluid 621 inside the drill collar, drill collar 90, fluid 625 outside the drill collar, and a formation 95. Radial particle velocity associated with the quadrupole wave motion is displayed shaded 611, 613. These FIG. 6A snapshots display the locations of wavefield intensity at several instants of time (0.24 milliseconds for 601, 1.22 milliseconds for 603, and 2.21 milliseconds for 605, respectively). In the borehole fluid 625 annulus high wavefield intensity is seen 611 and high wave field intensity is seen in the collar 613. For all the three time instants 601, 603 and 605, the wavefield intensity in the entire borehole containing the collar is dominated by the collar quadrupole wave. Formation quadrupole wave is weakly excited, which is out of phase with the collar wave.

Figure 6B:
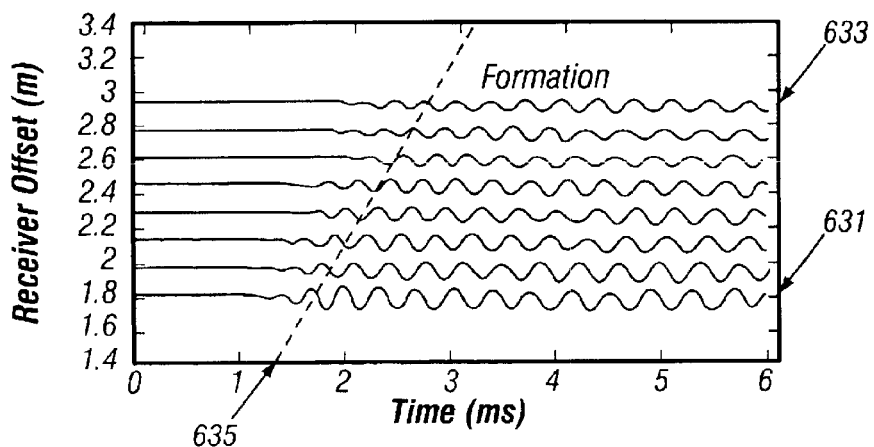
FIG. 6B shows time domain displays of the data in FIG. 6A.

The time domain array waveforms are shown in FIG. 6B. The time-domain quadrupole waveforms of the receiver array are displayed in FIG. 6B where time is represented along the horizontal axis. Quadrupole acoustic waveforms are displayed by offset corresponding to source-receiver distance along the vertical axis in FIG. 6B. Receiver locations are spaced 0.1524 m apart beginning with the near trace waveform at 1.833 m 631 to 2.9 m 633 offset from the source. The time domain waveforms are dominated by the collar quadrupole wave that has a moveout velocity of about 1,300 m/s. The dashed line 635 represents the arrival time for the formation quadrupole wave. In this case, it is difficult to measure the formation quadrupole wave in the presence of the strong collar wave. This example demonstrates the importance of the frequency band selection for the LWD quadrupole wave generation and measurement devices.

Conventional processing of array sonic data is based on semblance measurements of time domain data recorded by an array. Commonly, a semblance is determined in the slowness-time domain of the array data to obtain the velocity of propagation of a wave. Implicit in the processing is the assumption that the propagation velocity is non-dispersive. We digress briefly to derive an important theoretical result relating the semblance time coherency (STC) to the characteristics of the dispersion curve itself.

We start with an important result, obtained by *Kimball* which expresses the relationship between the time domain and frequency domain semblance $$\bar{\rho}(\bar{S}, T_{ar}) = \frac{\int_{\omega=-\infty}^{\infty} \bar{\rho}^*[u(\bar{S}, \omega)]|A(\omega)|^2 d\omega}{\int_{\omega=-\infty}^{\infty} |A(\omega)|^2 d\omega} \quad (5)$$

where $$\bar{\rho}^*[u(\bar{S}, \omega)] = \frac{1}{m^2}\left[\frac{\sin^2(mu)}{\sin^2(u)}\right] \quad (6)$$

and $$u = \frac{\omega[S(\omega, S^*) - \bar{S}]\delta}{2}. \quad (7)$$

The left-hand side in eq. (5) represents the time domain semblance function evaluated at the earliest arrival time (over the array), $T_{ar}$, of the mode of interest, at arbitrary slowness. Eq. (5) expresses the fact that the time domain semblance $\bar{\rho}$ is a spectral weighted average of the frequency domain semblance $\bar{\rho}^*$, weighted by the wave's power spectrum $|A(\omega)|^2$. Apart from the angular frequency, $\omega$, the frequency domain semblance $\bar{\rho}^*$ is parametrized by the total number of receivers (in the array), m in eq. (6), the inter-receiver spacing, $\delta$ in eq. (7), and the slowness dispersion function, $S(\omega, S^*)$ of the mode of interest. The slowness dispersion function is parametrized by the 'true' formation shear slowness, $S^*$. It is easily shown that is sharply peaked at $u=\pm n\pi$, ($n=0, 1, 2 \ldots$). Of all these peaks the peak at $u=0$ dominates the contributions to eq. (5), assuming that is band-limited to the frequency range of interest for the logging (dipole or quadrupole, as the case may be).

To obtain the slowness, that maximizes the semblance function cf. eq. (5), we now proceed to find this (in case of dispersive wave propagation) by setting , i.e., $$\frac{\partial \bar{\rho}^*}{\partial \bar{S}} = \frac{\int_{\omega=-\infty}^{\infty} \frac{\partial \bar{\rho}^*}{\partial u} \frac{\partial}{\partial \bar{S}}|A(\omega)|^2 d\omega}{\int_{\omega=-\infty}^{\infty} |A(\omega)|^2 d\omega} = 0 \quad (8)$$

Because the contribution to eq. (1), and consequently equation eq. (8), comes predominantly from $u=0$, we only need to retain the leading order of $$\frac{\partial \bar{\rho}^*}{\partial u}$$

in the vicinity of $u=0$ in eq. (4), i.e., This yields the result $$\bar{S} = \frac{\int_{\omega=-\infty}^{\infty} S(\omega, S^*)\omega^2|A(\omega)|^2 d\omega}{\int_{\omega=-\infty}^{\infty} \omega^2|A(\omega)|^2 d\omega} \quad (9)$$

Eq. (9) states an important new result: The slowness value $\bar{S}$, as obtained by applying semblance (a non-dispersive time domain method) to dispersive array waveforms, is the weighted spectral average of the slowness dispersion function $S(\omega, S^*)$ The weighting function is given by $\omega^2 |A(\omega)|^2$. This slowness is therefore designated as "centroid phase slowness", centroid with respect to the wave's power spectrum $A(\omega)^2$ multiplied by $\omega^2$. Eq. (9) states that the moveout slowness (or velocity) of a dispersive wave, as obtained from a non-dispersive time-domain array processing method (e.g., semblance), is a weighted spectral average of the wave's dispersion curve. Although eq. (9) is obtained assuming an infinite time window length, the concept of spectral weighting, as stated in eq. (9) can be extended to situations where a finite window length is used.

In the actual semblance processing of array waveform data, the window length normally includes only one or two cycles of the waveform. Consequently, the assumption of the infinite window length, as required to derive eq. (9) is violated. This means that in this situation the theoretical result of eq. (9) may not be directly applicable. Nevertheless, the same spectral weighting concept, as stated in eq. (9) can still be used. Taking the entire dispersive wavetrain, as in the derivation of eq. (9) results in weighting the slowness dispersion curve $S(\omega, S^*)$ towards higher frequency, as can be seen from the weighting function $\omega^2 |A(\omega)|^2$. This suggests that the weighting function can be modified to accommodate the effects of using a shorter processing window length. For instance, if we window the first arrival part of the dipole-shear wave data, which is usually of lower frequency and faster velocity, then some 'effective' weighting function can be used to replace $\omega^2 |A(\omega)|^2$. This function should weight $S(\omega, S^*)$ towards the lower frequency range. For example, we can use $A(\omega)$ Instead of $\omega^2 |A(\omega)|^2$ or some other empirical forms that fit the data. The importance of eq. (9) in acoustic logging is that it provides a simple method for correcting the dispersion effect for the shear slowness estimation from any dispersive acoustic wave data and is equally applicable to dipole and quadrupole data. Based on eq. (9), a dispersion correction is applied in the present invention to quadrupole and dipole data.

Figure 7:
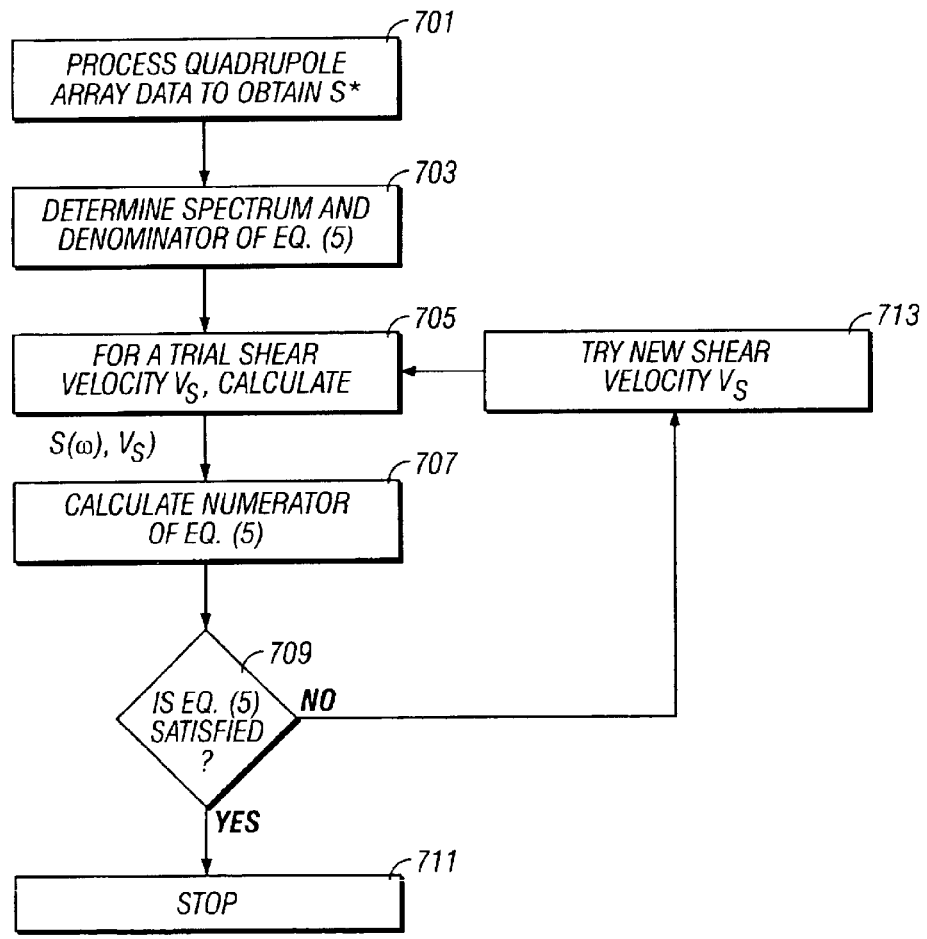
FIG. 7 is a flow chart of one embodiment of the invention used for obtaining formation shear velocity from quadrupole array data.

In one embodiment of the invention, dispersive quadrupole acoustic data are used for obtaining the formation shear velocity. The flow chart for the invention is given in FIG. 7. Quadrupole acoustic data are acquired (see FIGS. 5B and 6B for example), and processed using semblance methods to obtain a slowness S* 701. Examples of suitable methods of semblance processing are given in, for example, U.S. Pat. Nos. 6,023,443 and 6,427,124 to *Dubinsky* et al, having the same assignee as the present invention and the contents of which are fully incorporated herein by reference. The quadrupole wave spectrum $A(\omega)$ is determined for a suitable trace in the array, such as the first trace, and the denominator of eq. (9) is determined 703. For a trial shear wave velocity, Vs, a slowness dispersion curve $S(\omega, S^*)$ is determined 705. Determination of the dispersion function requires knowledge of the size and modulus of the logging tool, the borehole radius, the mud density in the borehole, the acoustic velocity in the mud, and the rigidity of the logging tool. From the dispersion slowness, the numerator of right hand side of eq. (9) is calculated 707. The ratio of the numerator and the denominator gives a weighted spectral average slowness. This is compared to the measured slowness from 701 to see if eq. (9) is satisfied. If the equation is satisfied, the formation shear velocity is equal to the trial velocity in 705 and the process stops 711. If eq. (9) is not satisfied, then a new shear velocity of the formation is selected 713 and the process is repeated until the formation shear velocity has been determined.

The drilling fluid property can have an important influence on the LWD quadrupole-wave dispersion characteristics. A calibration procedure can be utilized to determine the fluid property, which is specified by the drilling fluid velocity $V_f$. (Drilling fluid density is often known). For a formation interval of known shear velocity eq. (5) can be used to determine the fluid velocity $V_f$. For example, if the formation interval in the entire logged depths is a fast formation (shear velocity greater than $V_f$), the interval's shear velocity can be directly measured by the quadrupole wave using the method disclosed in *Tang '263* application. The only unknown parameter is the drilling fluid velocity $V_f$. The calibration procedure is essentially adjusting the value of $V_f$ in the dispersion equation till the following equation is satisfied:

$$S^* = \frac{\int_{\omega=-\infty}^{\infty} S(\omega, V_f)\omega^2 A^2(\omega)d\omega}{\int_{\omega=-\infty}^{\infty} \omega^2 A^2(\omega)d\omega} \quad (10)$$

Once the fluid property is specified from calibration, it is used in the dispersion equation (5) to calculate the quadrupole-wave dispersion curve for the dispersion correction and $V_s$ estimation. An alternate method for determining $V_f$ is disclosed in U.S. patent application Ser. No. 10/298,706 of *Kurkoski* et al, having the same assignee as the present application and the contents of which are fully incorporated herein by reference.

Another embodiment of the present invention uses quadrupole acoustic data in combination conjunction with cross dipole data (4C data) to determine the direction and extent of azimuthal anisotropy in the earth formation. The dipole-orientation problem caused by tool rotation can be solved by recording the high side HS toolface angle T (in FIG. 9 this angle is denoted by T.) of the rotating tool The angle HS can be derived from magnetometer measurements in combination with other survey data, such as that obtained using a gyroscope, accelerometer, or magnetometers The acquired data can be converted to a coordinate system fixed with reference to the borehole. Changes in the borehole inclination or azimuth usually are small in comparison to the time scale at which the acoustic measurements are made. This is possible because, compared to the time period (~0.1–1 s; typically 0.5 s) of one complete drill bit rotation, the transit time of a dipole acoustic signal from source to receiver is very short (<0.01 s; typically 0.002 to 0.005 s). Furthermore, in alternate embodiments of the invention, the acquired data in the borehole coordinates can be converted, even when the data are still in the downhole acquisition system, to a fixed coordinate system (e.g., ., the earth coordinates) through a coordinate transformation. This gives a 4C data set in the earth coordinates. Alternatively, the data may be converted to a formation coordinate system based on measurements of the formation dip angle and strike direction. All of these coordinate transformations are well known in the art. For the purposes of this invention, all that is necessary is to transform to a fixed coordinate system.

Figure 9:
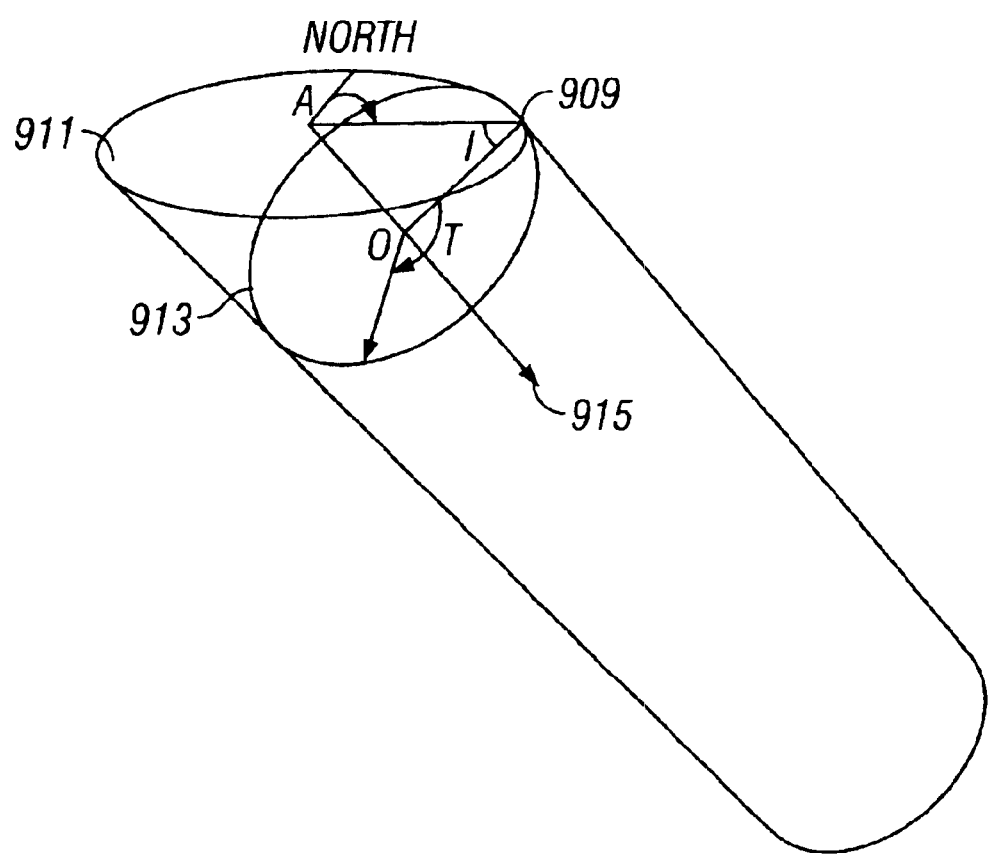
FIG. 9 is a schematic illustration of the geometry of a tool in a wellbore.

The geometry of a tool in a borehole is illustrated in FIG. 9. The tool z-axis (and the axis of the borehole) are denoted by 915. A horizontal plane intersecting the borehole is denoted by 911. A cross section of the borehole and the tool perpendicular to the z-axis is denoted by 913. The inclination of the borehole is given by I and a high side toolface is defined by 909. The high side (HS) angle between the x-axis of the tool and the high side is given by T. The borehole azimuth with respect to north is denoted by the angle A.

Denoting by XX, XY, YX and YY the four components of data recorded in a fixed coordinate system, the azimuth of the fast shear polarization $\theta$ relative to the fixed coordinate system can be found by minimizing the energy of the cross-components:

$$E(\theta) = \int_T [X'Y'(\theta, t)]^2 dt + \int_T [X'Y'(\theta, t)]^2 dt \quad (11)$$

where T is the time duration of the dipole signal, $\theta$ is the angle between the fixed coordinate system and the coordinate system defining the principal directions of azimuthal anisotropy, and $$XY' = (XX-YY)\cos\theta\sin\theta + XY\cos^2\theta - YX\sin^2\theta$$

$$YX' = (XX-YY)\cos\theta\sin\theta + YX\cos^2\theta - XY\sin^2\theta \quad (12)$$

are the cross component data in the principal coordinate system. It is thus clear that the four-component LWD dipole data obtained from the above procedure can determine the azimuth, $\theta$, of the anisotropy. The magnitude of the anisotropy, however, must be determined by the (fast and slow) dipole signals in the two principal directions. With the $\theta$-value determined from eq. (7), the principal dipole signals are obtained:

$$XX' = XX\cos^2\theta - (XY+YX)\cos\theta\sin\theta + YY\sin^2\theta \quad (13)$$

$$YY' = YY\cos^2\theta + (XY+YX)\cos\theta\sin\theta + XX\sin^2\theta$$

The calculation is done for all receivers in an acoustic receiver array. Then the propagation slowness for the above two signals can be determined by respectively processing the two array data sets. The signal with a smaller propagation slowness $S_1^*$ (faster velocity) is the fast principal dipole signal, denoted by FP, and the other one is the slow principal dipole signal, denoted by SP, with a slowness $S_2^*$. The difference, $\delta S_2^* - S_2^*$, between the two slowness values is caused by the anisotropy and can be used to determine the anisotropy magnitude.

Next, we address the issue of dispersion of LWD dipole measurement. As discussed above with respect to the LWD quadrupole measurement, the LWD dipole also does not yield the direct measurement of formation shear. Because of the severe interference of the drill collar, the dipole-wave velocity is significantly below the formation shear velocity value. Although the dipole-wave phase slowness dispersion curve, $S(\omega)$, which is sensitive to the formation shear-wave velocity, can be used to indirectly infer the formation shear velocity, the problem is aggravated by the fact that one now needs to determine two unknowns, the fast and slow shear velocities $V_1$ and $V_2$. In addition, the LWD system, i.e., drill collar and borehole size, drilling fluid property, and tool decentralization, etc., can significantly affect the dipole-wave dispersion characteristics. The measured fast and slow shear slowness, $S_1^*$ and $S_2^*$, according to the weighted spectral average slowness method discussed above with reference to quadrupole dispersion, are now respectively given by $$S_1^* = \frac{\int_{-\infty}^{\infty} S_1(\omega, V_1, V_2, SYS)[FP(\omega)]^2 d\omega}{\int_{-\infty}^{\infty} [\omega FP(\omega)]^2 d\omega} \quad (14)$$

$$S_2^* = \frac{\int_{-\infty}^{\infty} S_1(\omega, V_1, V_2, SYS)[SP(\omega)]^2 d\omega}{\int_{-\infty}^{\infty} [\omega SP(\omega)]^2 d\omega}$$

where $S_1(\omega, V_1, V_2, SYS)$ and $S_2(\omega, V_1, V_2, SYS)$ are the dipole phase slowness dispersion curves in the fast and slow polarization directions, respectively. The dispersion curves are parametrized by the fast and slow shear velocities $V_1$ and $V_2$. The curves are also significantly influenced by the LWD system, denoted by the symbol, SYS. Without specifying the parameter(s) in the LWD system, it is difficult to estimate the shear velocities $V_1$ and $V_2$. Specifically, the drilling mud property (density and acoustic velocity) can significantly influence the dipole-wave dispersion characteristics.

The quadrupole shear measurement provides additional information to help solve the problem. The measured quadrupole slowness, $S_q^*$ is given by $$S_q^* = \frac{\int_{-\infty}^{\infty} S_q(\omega, V_1, V_2, SYS)[\omega Q(\omega)]^2 d\omega}{\int_{-\infty}^{\infty} [\omega Q(\omega)]^2 d\omega} \quad (15)$$

where $S_q(\omega, V_1, V_2, SYS)$ is the quadrupole-wave phase slowness dispersion curve as a function of the fast and slow shear velocities $V_1$ and $V_2$ and the LWD system, SYS; $Q(\omega)$ is the quadrupole wave spectrum. With the three measurements given by eqs. (14) and (15), it is now mathematically possible to calibrate the LWD system, SYS, and determine the velocities $V_1$ and $V_2$.

The system given by eqs. (14) and (15)) can be simplified for small to moderate anisotropy situations. As would be known to those versed in the art, for most cases of interest in well logging, the azimuthal anisotropy is less than 0.2 For small anisotropy, the following approximations are applicable:

$$FP(\omega) \approx SP(\omega) = A(\omega) \quad (16)$$

$$S_2(\omega, V_1, V_2) \approx S(\omega, V_2)$$

$$S_1(\omega, V) \approx S_2(\omega, V) + \frac{\partial S_2(\omega, V)}{\partial V_2} \delta V$$

where $\delta V = V_1 - V_2$ is the difference between the fast and slow shear velocities. Furthermore, theoretical modeling indicates that a quadrupole wave in an azimuthally anisotropic formation is dominated by a slow quadrupole wave (see FIG. 10) and therefore primarily measures the slow shear velocity $V_2$ (*Ellefsen*, 1990). This result, together with the above approximations, yields the following two equations to determine the anisotropy magnitude.

$$S_2^* = \frac{\int_{-\infty}^{\infty} S_2(\omega, V_2, SYS)[\omega A(\omega)]^2 d\omega}{\int_{-\infty}^{\infty} [\omega A(\omega)]^2 d\omega} \quad (17)$$

$$\delta V = \frac{(S_2^* - S_1^*) \int_{-\infty}^{\infty} [\omega A(\omega)]^2 d\omega}{\int_{-\infty}^{\infty} \frac{\partial S(\omega, V_2, SYS)}{\partial V_2} [\omega A(\omega)]^2 d\omega}$$

The first equation, together the known slow shear velocity from the quadrupole measurement and the measured dipole slowness $S_2^*$ in the slow shear-wave polarization direction, can be utilized to calibrate the LWD system SYS. The calibrated system is then used to determine $\delta V$. The desired anisotropy magnitude can thus be determined from the LWD dipole and quadrupole measurements.

Figure 8:
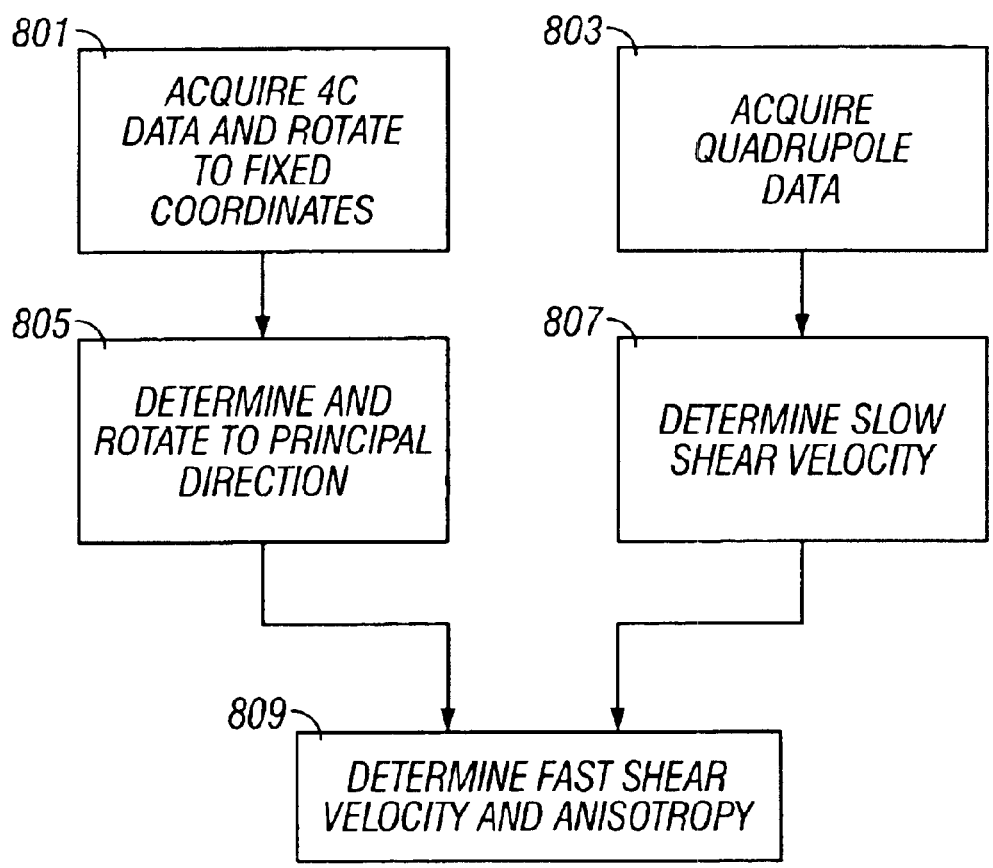
FIG. 8 is a flow chart of an embodiment of the invention used for determining fast and slow shear velocities from 4C and quadrupole array data.

The methodology described above for determination of azimuthal anisotropy is schematically illustrated in FIG. 8. 4C array data are acquired and rotated into a fixed coordinate system 801. The angle necessary rotation angle for this purpose may be obtained by measurements with a magnetometer on the rotating logging tool. The principal direction $\theta$ is determined relative to the fixed coordinate system using prior art methods such as discussed above with reference to eq. (11) and the data are rotated 805 to the principal coordinate system using eq. (12).

Quadrupole data are also acquired with the logging tool 803. In many instances, only one quadrupole wave is detectable and this is indicative of the slow shear wave velocity obtained 807. From the dipole data in the principal direction and the quadrupole data, the fast and slow shear velocity are obtained 809. This can be done as described above using the approximations given by eqns. (16)–(17). Alternatively, the calibration can be done without making the small anisotropy approximation, and the fast and slow shear velocities obtained directly from eqns. (14)–(15). The method used for obtaining the velocities from the array slowness measurement is substantially the same as described above with respect to FIG. 7.

In one embodiment of the invention, the transmitter receiver configuration used for the quadrupole logging can also be used for obtaining the 4C (cross-dipole data). This has been described in the *Tang* '263 application and ensures that the quadrupole and 4C data are acquired at substantially the same depth. In one embodiment of the invention, the 4C data are acquired along with the toolface information at specified time intervals, and following rotation into a fixed coordinate system, the individual components are stacked to improve the signal to noise ratio. This can be done over a specified amount of penetration of the earth formation by the drilling assembly and the logging tool. In an alternate embodiment of the invention, the toolface angle information is processed by a downhole processor that then uses the angle measurement to acquire the 4C data at a a fixed angle. In this alternate embodiment, the stacking is done prior to the rotation to a fixed coordinate system.

Figure 10:
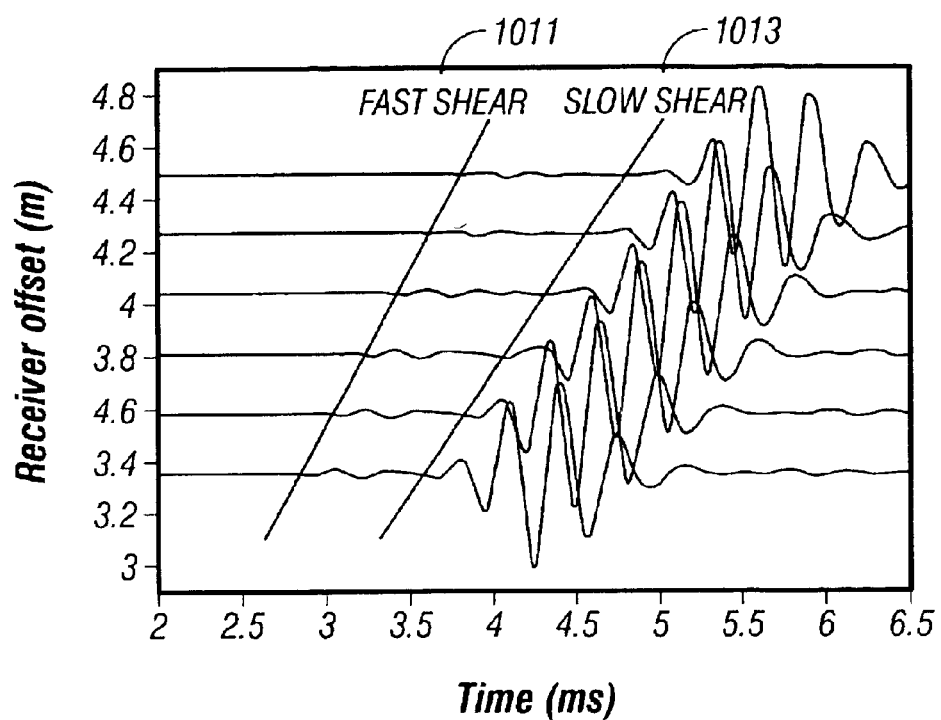
FIG. 10 shows an example of LWD acoustic modeling for an azimutally anisotropic formation wherein the quadrupole array data from a single transmitter shows both the fast and slow shear modes.

In an alternate embodiment of the invention, the fast and slow formation shear velocities are obtained from the quadrupole data only. The basis for this is shown in FIG. 10 which is an illustration of quadrupole array data at large amplifications. Shown in FIG. 10 are modeling results of quadrupole-wave propagation with an LWD acoustic tool and an azimuthally anisotropic formation. (Formation fast and slow shear velocities are 1185 and 938 m/s, respectively, and the drilling mud has a density of 1.56 g/cc and acoustic velocity of 1350 m/s.) This figure shows the presence of fast and slow quadrupole waves. The propagation of the two waves is respectively along the moveout of the fast and slow shear waves, as indicated by two time lines 1011 and 1013 in the figure. The slow quadrupole shows some dispersion effect, for the wave arrival is progressively delayed relative to the slow shear arrival time. The amplitude of slow quadrupole wave is much larger than that of the fast quadrupole wave. The importance of this theoretical result is that it demonstrates the azimuthal shear-wave anisotropy can be determined by simultaneously measuring the fast and slow quadrupole waves and determining their respective velocity.

Figure 11:
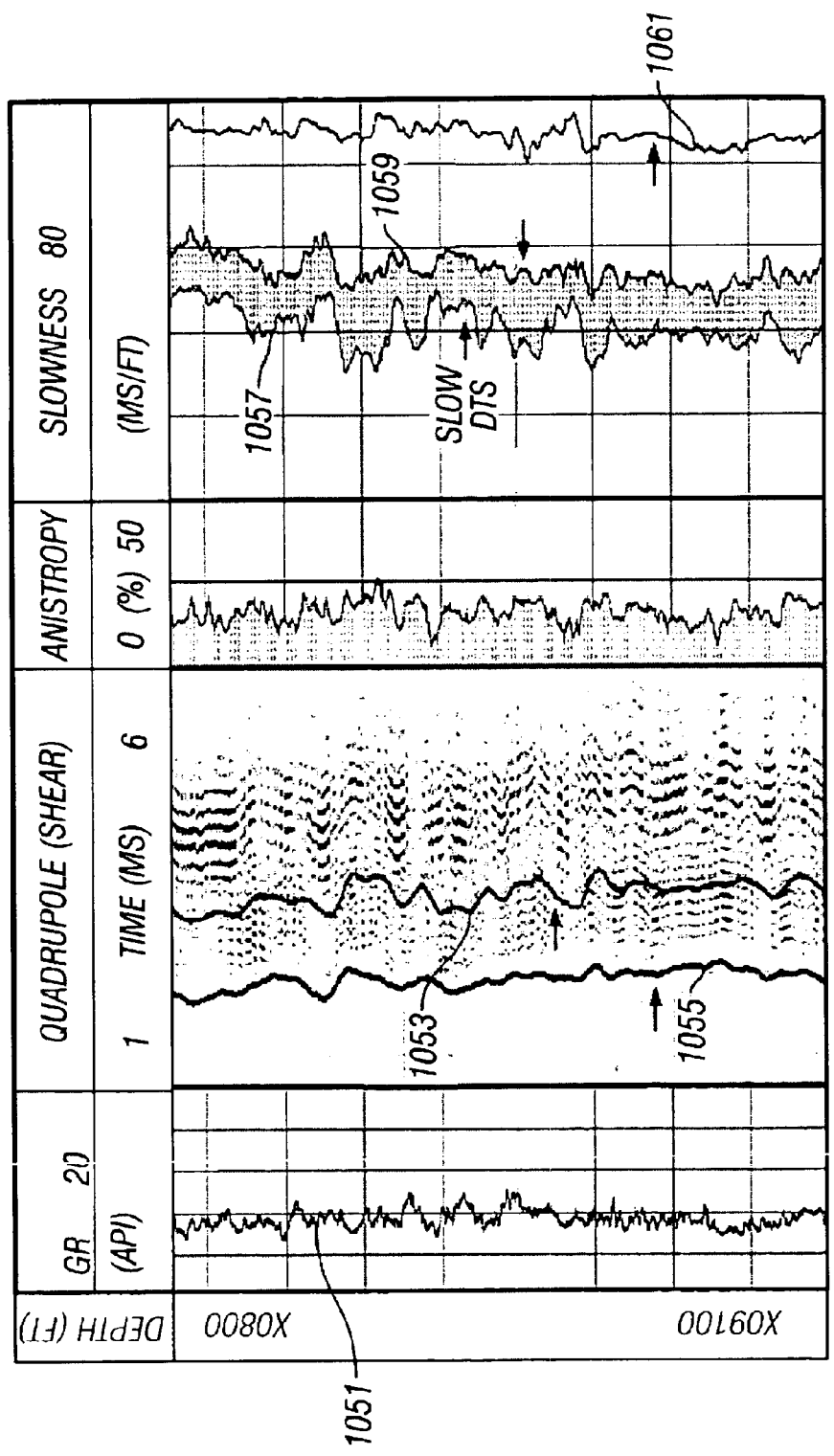
FIG. 11 shows results of processing of quadrupole data from a wellbore.

Following the theoretical prediction, a field LWD quadrupole data set is processed and analyzed to determine the azimuthal shear anisotropy. This is shown in FIG. 11. These data are acquired in a horizontal well drilled through a chalk formation. The low gamma-ray values 1051 shown in track 1 indicate that this is a carbonate-type (chalk) formation. Sedimentary rocks generally exhibit a transversely isotropic (TI) type of anisotropy between directions perpendicular and parallel to bedding. The TI anisotropy, seen from a horizontal borehole, becomes the azimuthal anisotropy, for the axis of the TI symmetry is now perpendicular to the borehole. Track 2 of FIG. 11 shows the LWD-measured quadrupole wave data (displayed using a VDL plot, only receiver 1 data from a six-receiver array is displayed). The data indeed show two arrivals, a fast wave 1055 with small amplitude and a slow wave 1053 with large amplitude. Track 4 shows the fast 1059 and slow 1057 slowness curves determined from the two (fast and slow) quadrupole waves, with their difference shaded, indicating anisotropy. The curve 1057 was obtained using the method described above with reference to FIG. 7, i.e., from the quadrupole data only and using a dispersion correction for the slow arrival 1053. The curve 1055 (and 1011 in FIG. 10 ) shows little or no dispersion and gives a direct measurement of the fast shear wave slowness 1059. Also shown in FIG. 11 is a compressional-wave slowness curve 1061, measured from the LWD acoustic tool. The shear slowness results are discussed below.

The fast and slow shear slowness curves show good correlation with each other. The two curves also show good correlation with the compressional slowness curve. The anisotropy magnitude, as determined by the relative difference between the fast and slow shear slowness values, is shown as the shaded curve in track 3. The shear anisotropy of this chalk formation generally varies between 10%–20%, which is a reasonable estimate for the anisotropy of a chalk formation. [Reported value of anisotropy of chalk, e.g, Austin chalk, is on the order of 15%, see *Sinha* et al., 1994] The field anisotropy determination example, coupled with the theoretical modeling, demonstrates the validity of the quadrupole-wave anisotropy-estimation method.

A drawback of the quadrupole approach is that it can only determine the anisotropy magnitude. Another potential drawback is that, as seen in FIGS. 10 and 11, the fast quadrupole usually has much smaller amplitude than that of the slow quadrupole wave. Furthermore, the quadrupole-only approach is applicable for large anisotropy situations where the splitting of fast and slow quadrupole waves can be easily determined. In the general situation of small to medium anisotropy, the approach using quadrupole and dipole combination is recommended. However, even for the situation where the azimuthal anisotropy is moderate, the values derived from the quadrupole-only analysis serve as a consistency check on results obtained using a combination of quadrupole and 4C data.

Next, we discuss the following seven subjects: (1) the collar effect, (2) the operating frequency effect, (3) the tool eccentricity effect, (4) the borehole size effect, (5) the mud effect, (6) the tool azimuth effect, and (7) the measurement of an anisotropic formation. These discussions are based on numerical simulations using a model.

Unless otherwise stated, we choose the borehole size to be 8.5 in. The mud weight is 11 lb/gal. By assuming the mud rigidity to be the same as that of water, we have the mud slowness to be 227 $\mu$s/ft. The drill collar has an inner diameter of 2⅛ in and an outer diameter of 7 in. The compressional and shear slownesses and density of the collar are 52 $\mu$s/ft, 97 ms/ft, and 7.85 g/cm³, respectively. See Table 1. The central source frequency is 1.5 kHz.

TABLE 1

Model parameters for quadrupole waveform calculations

| | |
|---|---|
| Collar ID | 2⅛ in |
| Collar OD | 7 in |
| Collar density | 7.85 g/cm₃ |
| Frequency | 1.5 kHz |
| Borehole | 8.5 in |
| Mud weight | 11 lb/gal |
| Mud slowness | 227 $\mu$s/ft |
| Form. compressional | 122 $\mu$s/ft |
| Form. shear | 305 $\mu$s/ft |
| Form. density | 2.1 g/cm³ |

Figure 12A:
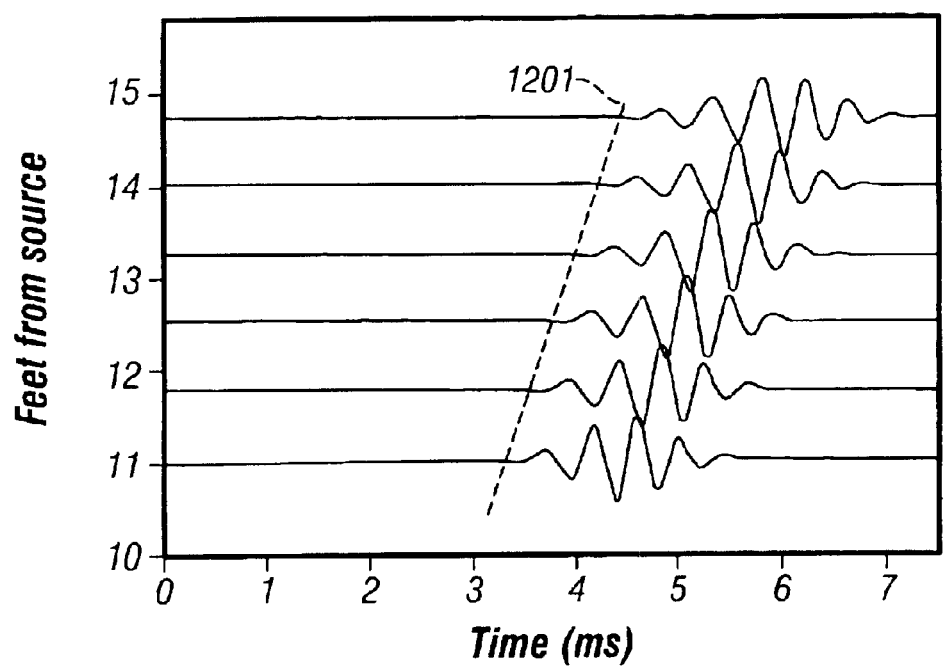
FIGS. 12a and 12b show examples of quadrupole waveforms with (a) and without (b) a drill collar.
Figure 12B:
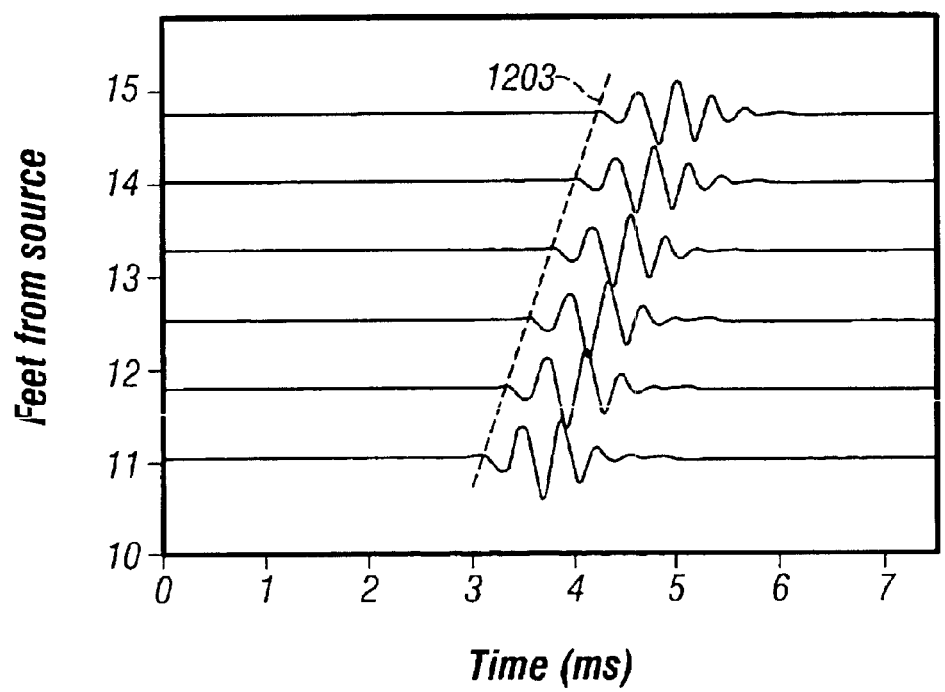

The presence of a drill collar alters the coupling condition of the tool with the formation. Because of the reduced fluid annulus between the collar and formation, the quadrupole wave will become more dispersive. This is clearly seen in FIG. 12. The initial, low-frequency arrivals 1201, 1203 define the formation shear velocity regardless of the collar being present or not. However, with the collar, the waveforms are more dispersive.

Figure 13:
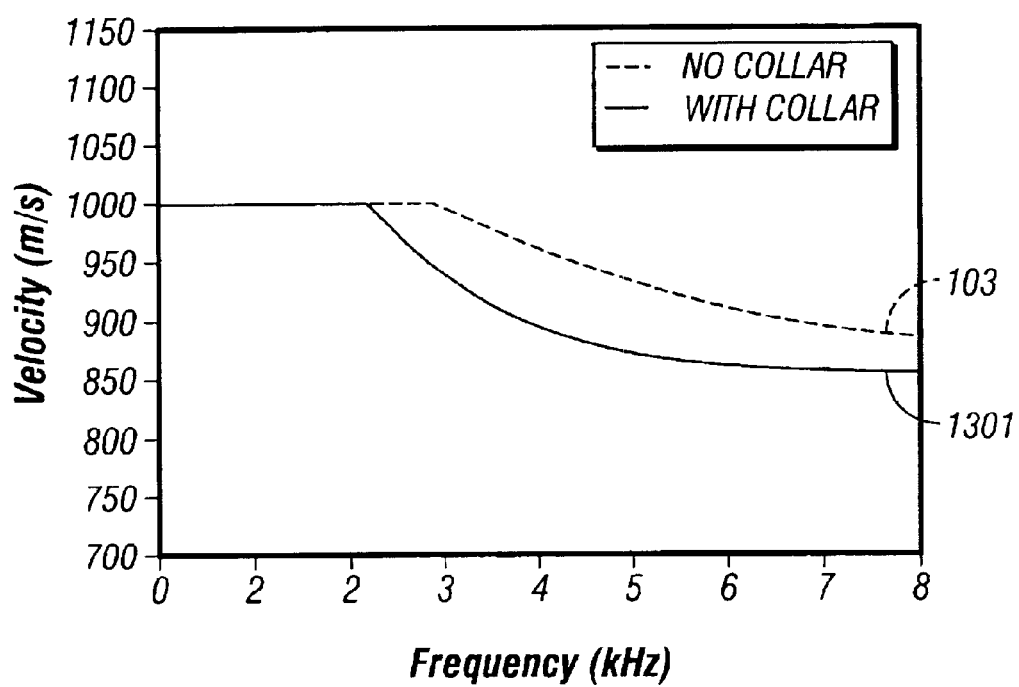
FIG. 13 shows an example of quadrupole dispersion curves with and without the drill collar.

Dispersion analysis in FIG. 13 confirms that the drill collar increases the dispersion of the quadrupole wave. Compare the dispersion with 1301 and without 1303 the drill collar. The collar also lowers the cut-off frequency of the quadrupole wave. This implies that a source frequency of 1.5 kHz now excites the relatively higher frequency portion of the dispersion curve. This result shows that the effect of a drill collar must be taken into account in interpreting the LWD data. It also implies that a lower operating frequency must be used for LWD than for an openhole under the same formation condition.

Figure 14A:
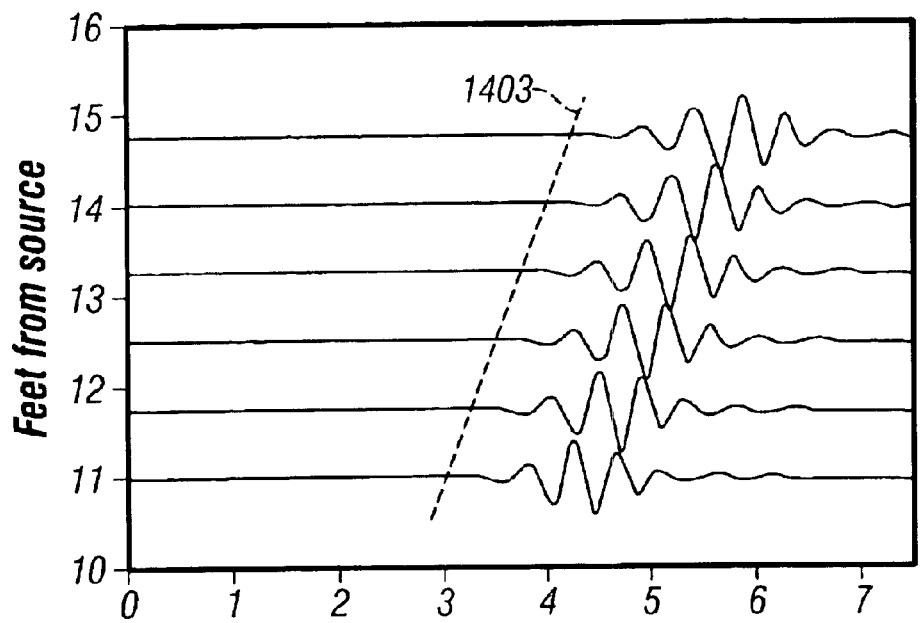
FIGS. 14a and 14b show examples of quadrupole waveforms at two different operating frequencies: (a) 1.5 kHz and (b) 3 kHz.
Figure 14B:
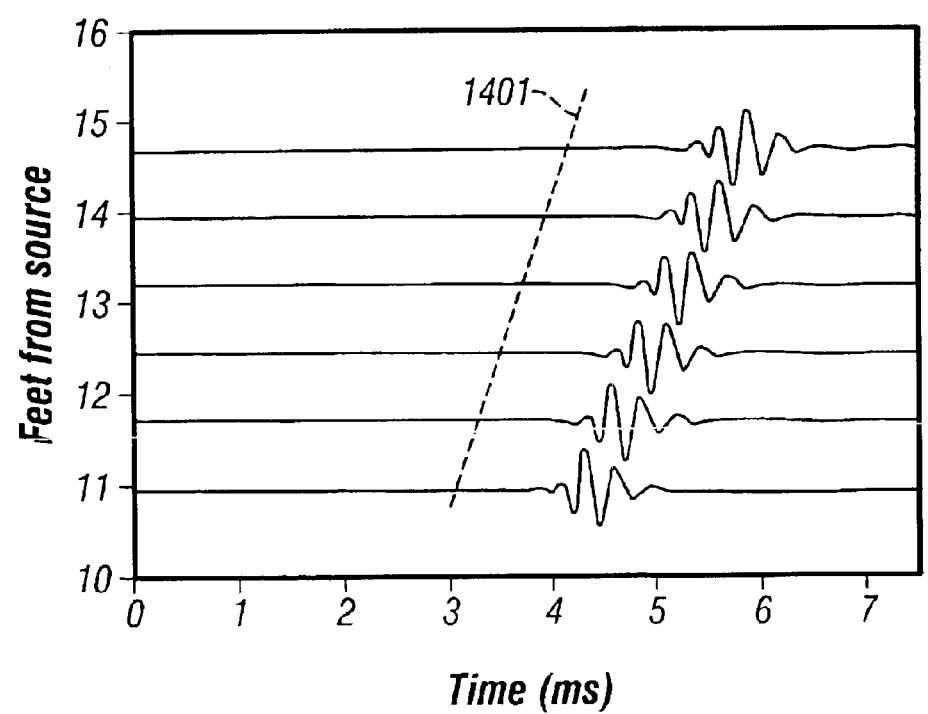

Because the quadrupole waveforms are dispersive, derivation of the formation shear velocity will depend on the operating frequency. Like the wireline dipole shear measurement, the shear velocity derived from quadrupole waveforms approaches the true formation shear velocity in the low frequency limit and decreases as frequency increases. For minimal dispersion effect, the lowest possible frequency should be used. If frequency falls in the range of strong dispersion (around 3.5 kHz in FIG. 13 in the presence of the collar), an Airy phase may develop which will severely obscure the earlier, lower-frequency arrivals. To illustrate, FIG. 14 shows the waveforms at 1.5 kHz and 3 kHz. Obviously, the energy in the 3-kHz wave package is much delayed as compared to 1.5 kHz. The initial arrival times for the two different frequencies 1401, 1403 appear to be the same but the initial arrivals for 3 kHz have significantly lower signal-to-noise ratios. This confirms that a low frequency must be used.

In deviated and horizontal wells, tool eccentricity is unavoidable. A decentralized quadrupole tool produces monopole and dipole contaminations that interfere with the quadrupole signals. The effect depends on the amount of eccentricity. We consider three representative cases with the tool being (a) centralized, (b) in contact with the formation, and (3) half way between. For a 7-in tool in a 8.5-in borehole, the maximum tool eccentricity is about ¾-in. To prevent the tool from being rigidly connected to the formation even for case (b), a fluid gap of one cell size wide (6 mm) is left between the tool surface and the formation.

Figure 15A:
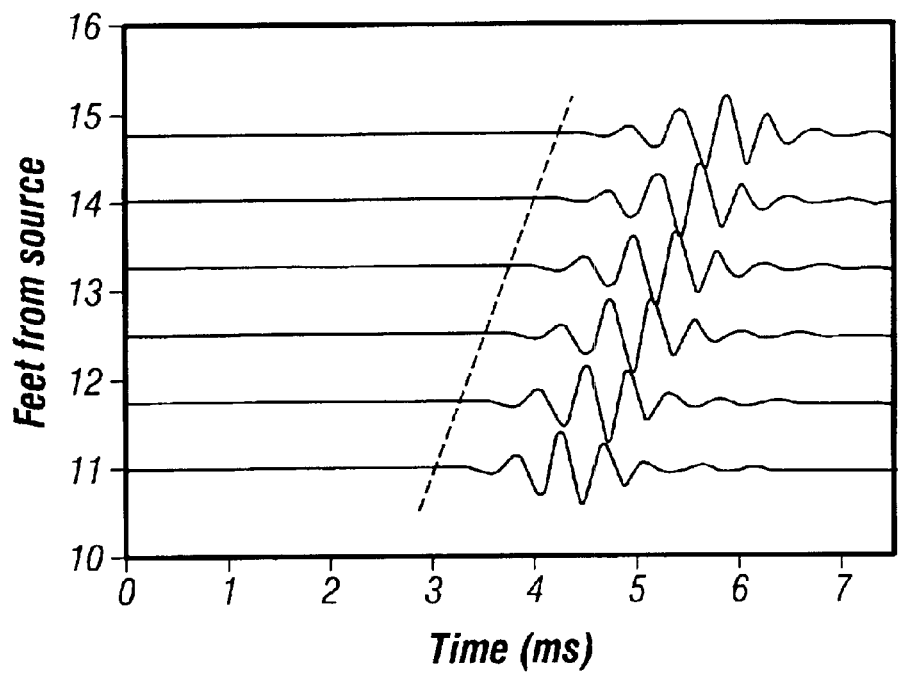
Figure 15B:
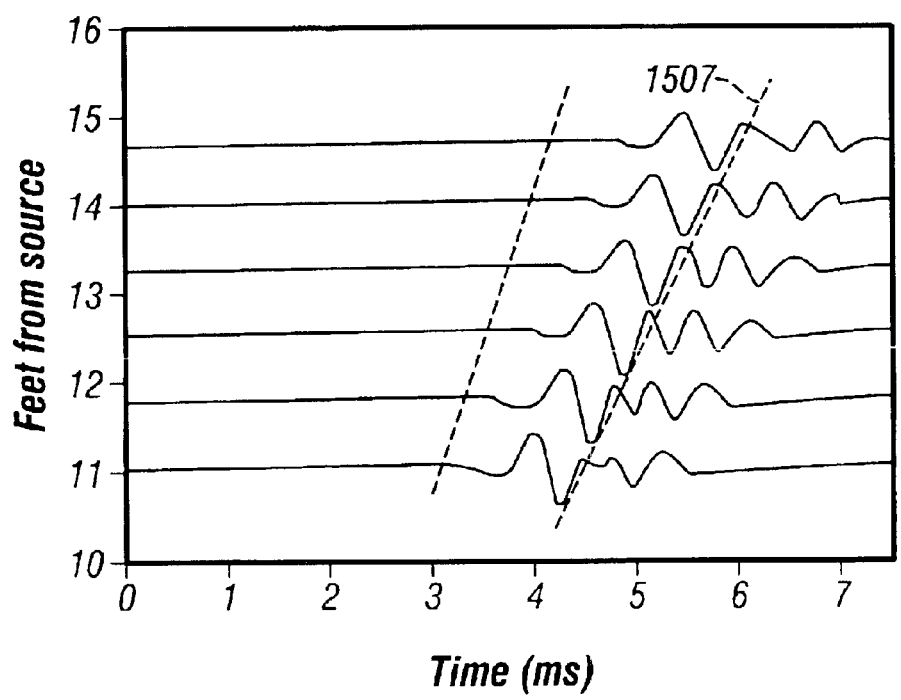
Figure 15C:
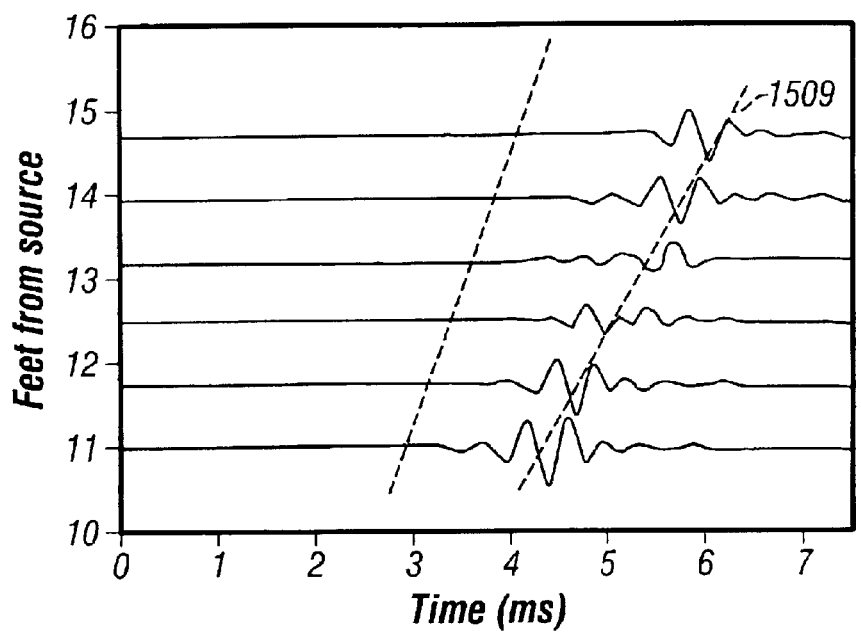

FIG. 15 shows the waveforms for the three different cases. In the maximum eccentricity case (FIG. 15b), the semblance-derived slowness is about 30% larger than for the centralized case. However, for a moderately decentralized tool (FIG. 15c), the slowness is very close to that of a centralized tool. This observation is important because in practice the tool is often equipped with stabilizers from its ends that limit the eccentricity effect.

A decentralized quadrupole source generates mono-pole, dipole, and quadrupole excitations. The dipole excitation generates flexural tool wave. Around a source frequency of 1.5 kHz, the flexural tool wave can propagate at velocities up to 2000 m/s (Tang et al., 2002), much faster than the formation shear velocity. This wave is visible, especially from FIG. 15b.

A more important consequence of a decentralized quadrupole tool is the generation of monopole excitation that produces a Stoneley wave propagating along the borehole. The Stoneley wave may have strong energy and interfere with the quadrupole signals. FIGS. 15b and 15c show the presence of the Stoneley wave. Notice the frequency change in the first trace (11 ft spacing) at about 4.7 ms in FIG. 15b and the third trace (12.5 ft spacing) at about 5 ms in FIG. 15c. Superimposed on the plots are the predicted Stoneley wave arrivals 1507, 1509 in the low-frequency limit. The Stoneley wave velocity in the presence of a drill collar is given, for the low-frequency limit, by (Tang, 2003)

$$V = \frac{V_{mud}\sqrt{1-(a/R)^2}}{\sqrt{1-(a/R)^2 + (\rho_{mud} V_{mud}^2)/(\rho_s/V_s^2)}} \quad (18)$$

where $V_{mud}$ is the mud velocity, $\rho_{mud}$ the mud density, $V_s$ the formation shear velocity, $\rho_{mud}$ the formation density, a the tool radius, R the borehole radius.

Figure 16A:
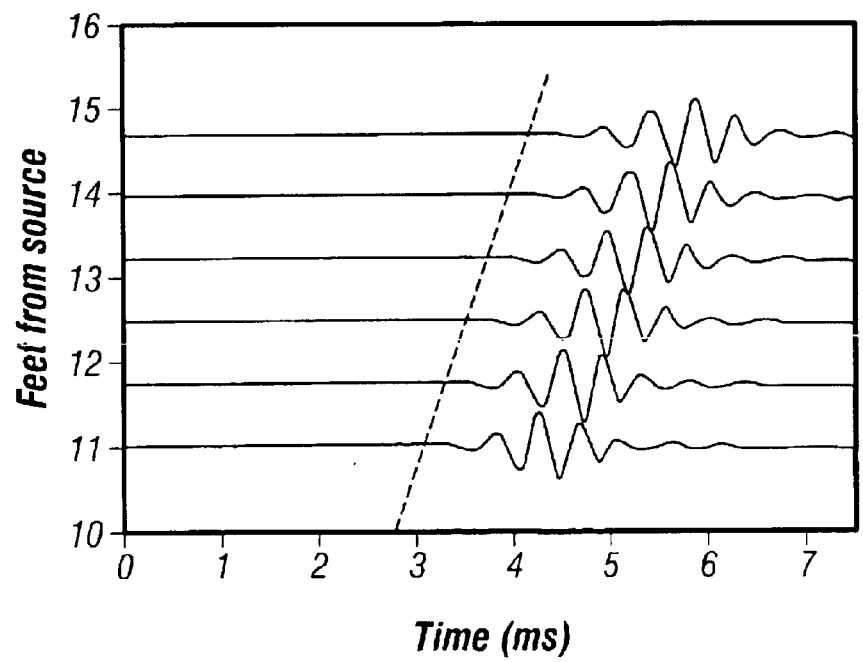
Figure 16B:
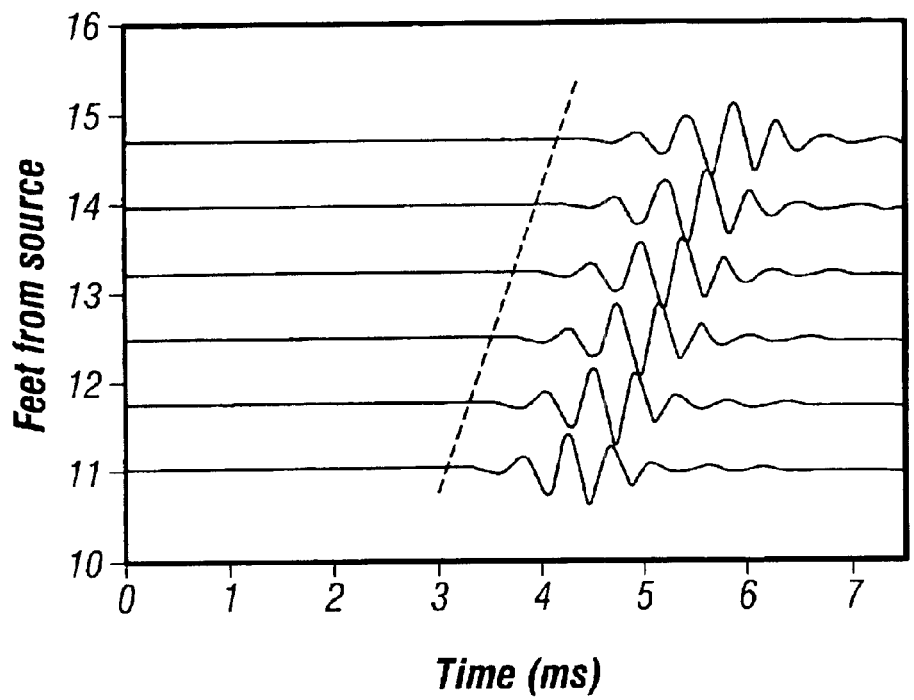
Figure 16C:
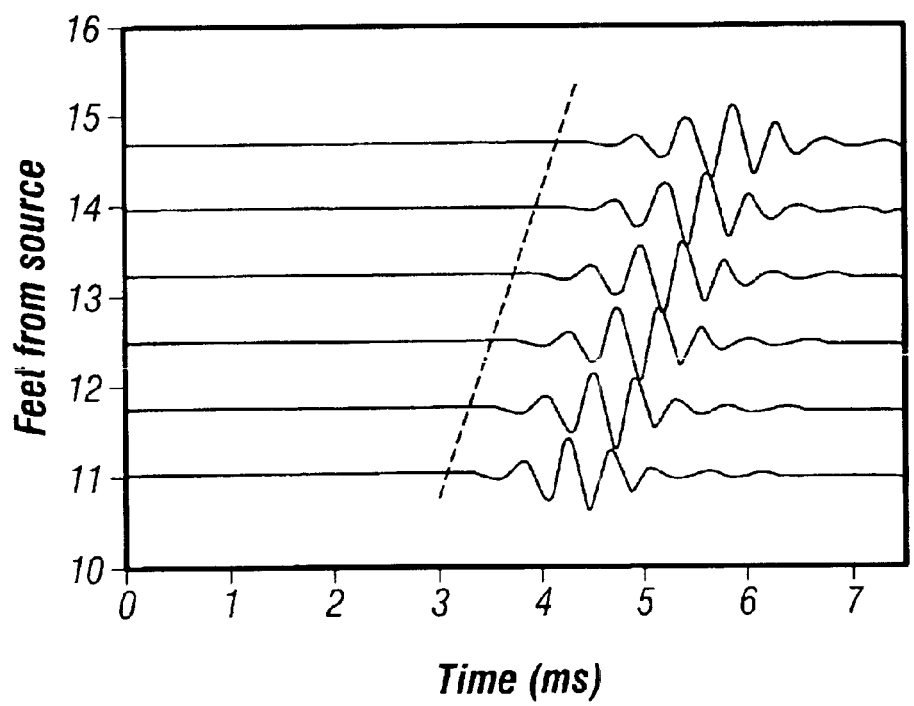

The typical hole size for running a 7-in tool is 8.5 in. However, larger holes are possible in practice depending on the drill bit size. The major concern about the hole size is its effect on the tool coupling with the formation and the dispersion characteristics of the quadrupole wave. To illustrate the capability of a 7-in tool for larger holes, FIG. 16 shows the waveforms for three different hole sizes from 8.5 in to 12.25 in. Apparently, as the hole size increases, the frequency content of the waveforms is slightly decreased. However, the derived shear velocities have little variation. This indicates that the hole size is not critical to quadrupole shear measurement.

Figure 17A:
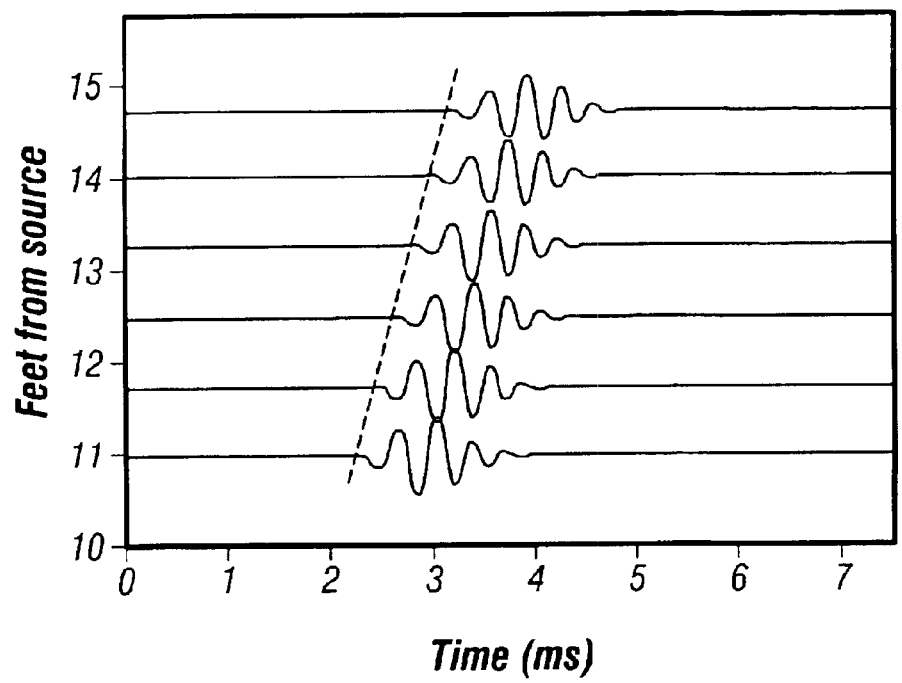
FIGS. 17a and 17b show the effects of mud weight on the formation quarupole signals (a) 8.8 lb/gal, and (b) 16 lb/gal.
Figure 17B:
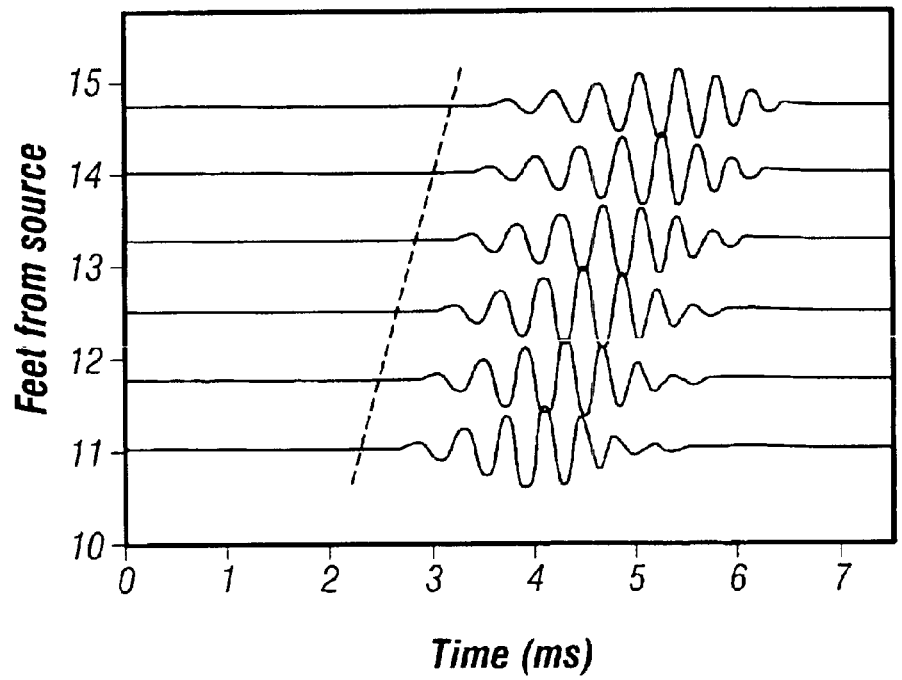
Figure 18A:
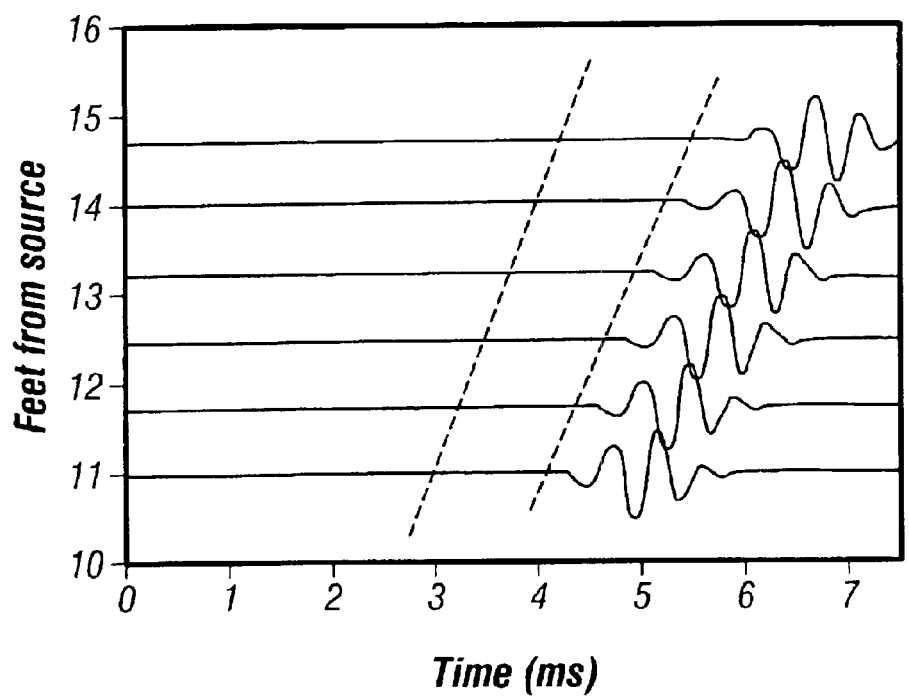
FIGS. 18a, 18b, 18c and 18d show the effects of borehole inclination to the formation bedding of (a) 0°, (b) 30°, (c) 60° and (d) 90°.
Figure 18B:
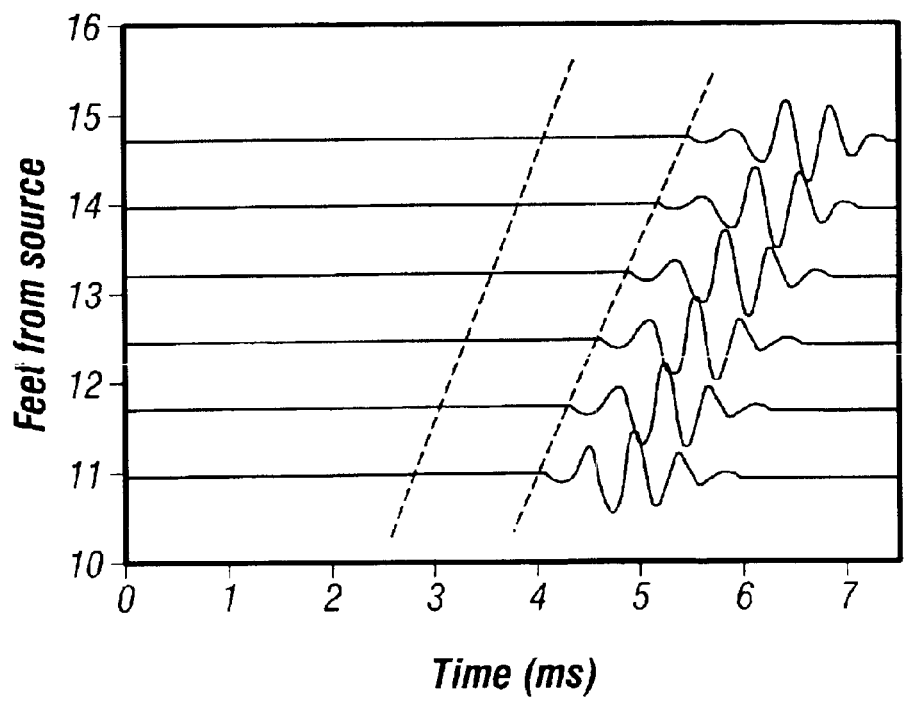
Figure 18C:
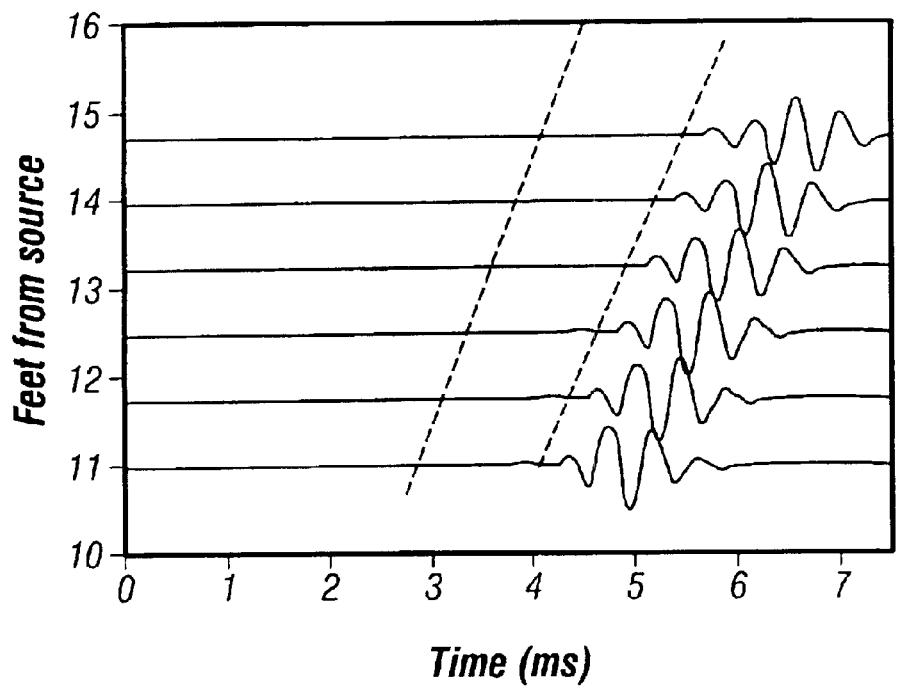
Figure 18D:
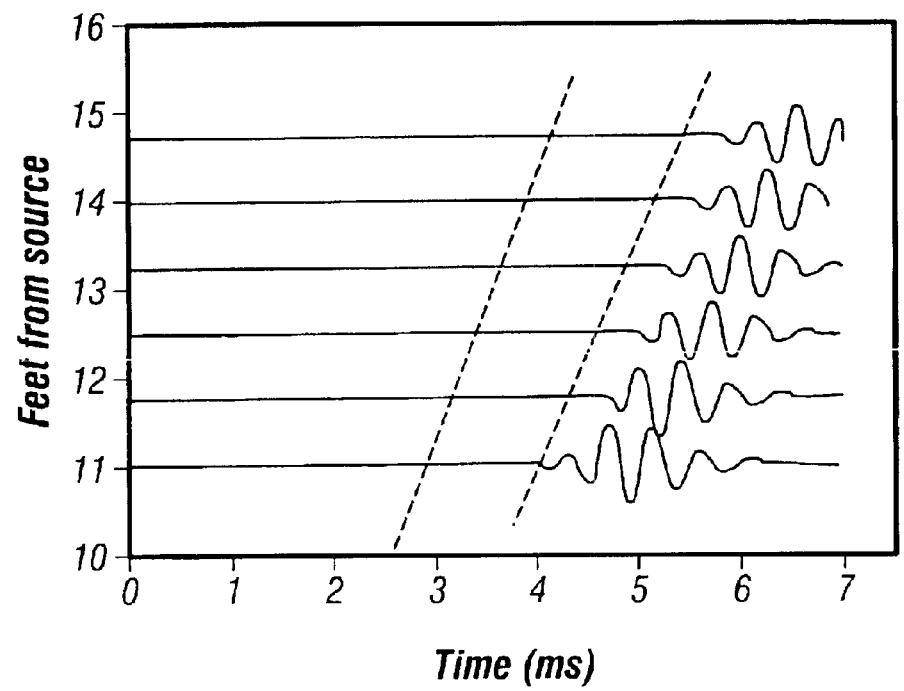

Mud weight can significantly affect the quadrupole waveform signatures. Depending on the formation shear velocity, a slow formation (shear velocity less than P-wave velocity of mud) can become fast (shear velocity greater than P-wave velocity of mud) if the mud weight is exceedingly high. The dispersion characteristics will thus change even for the same formation. This is particularly important in cases where different mud weights are used to drill different sections of a well to optimize the well stability and for other considerations. FIG. 17 shows the waveforms for mud weights of 8.8 lb/gal and 16 lb/gal, respectively. The corresponding mud slownesses are 227 µs/ft and 274 µs/ft, respectively. The formation shear slowness is 234 µs/ft, falling in between those of the lighter and heavier muds. The frequency is again 1.5 kHz. Note that for the heavier mud, the wave is more dispersive and lasts longer than for the lighter mud. This is consistent with the observation that a fast formation is more dispersive than a slow one (Kurkjian and Chang, 1986; Chen, 1989).

A TI formation has two distinct shear velocities: faster and slower velocities. Ellefsen et al. (1988) showed that in a vertical well, the quadrupole wave is primarily responsive to the slower shear velocity and has little sensitivity to the faster velocity. However, it is not clear what the tool measures in a deviated well. This issue is important because many reservoirs are acoustically anisotropic. To investigate, we assumed that formations have 30% anisotropy. Such high anisotropy is not unrealistic (Wang, 2002). We consider three representative cases: (a) fast, (b) intermediate, and (c) slow formations. The slownesses of each formation are given in Table 2. The fast formation has its both shear velocities faster than the mud velocity; the slow formation has its both shear velocities slower than the mud velocity. The intermediate formation has one shear velocity faster and the other slower than the mud velocity. These three cases are expected to cover all practical formation types.

TABLE 2

Shear slownesses and densities of three TI media.
The mud slowness is 227 µs/ft.

| Type of formation | Faster shear (µs/ft) | Slower shear (µs/ft) | Density (g/cm³) |
|---|---|---|---|
| Fast | 160 | 203 | 2.5 |
| Intermediate | 208 | 262 | 2.3 |
| Slow | 305 | 385 | 2.1 |

We focus on the slow formation to study the tool measurement at various borehole deviation angles. We produced waveforms for deviation angles from 0° degree (vertical) to 90 degrees (horizontal) with a 15°increment. Only those for 0°, 30°, 60°, and 90° are shown in FIG. 18. To simplify, we assume that the tool is centralized. This condition may rarely be achieved, especially in a deviated well, but the result can still give insights into the tool measurement. FIG. 18 shows that in a vertical well, the wave measures only the slower shear velocity 1803 and not the fast velocity 1801. This is consistent with the theoretical expectation. At 30° dip, the initial arrivals, though barely perceptible in the figure, fall in between the faster and slower shear arrivals, indicating that the wave picks up a mixture of the faster and slower shear velocities. At 60° to 90° deviations, the wave splits into faster and slower arrivals corresponding to the faster and slower shear velocities, respectively. This is similar to the behavior of a wireline dipole tool in a TI medium (Wang et al., 2002).

Figure 19A:
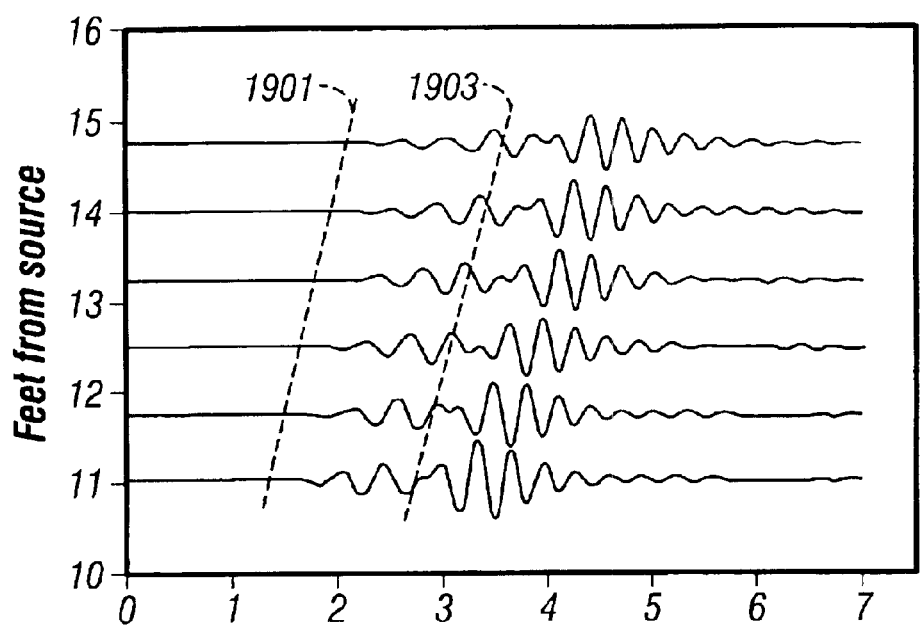
FIGS. 19a and 19b shows quadrupole signals for a fast and intermediate formation.
Figure 19B:
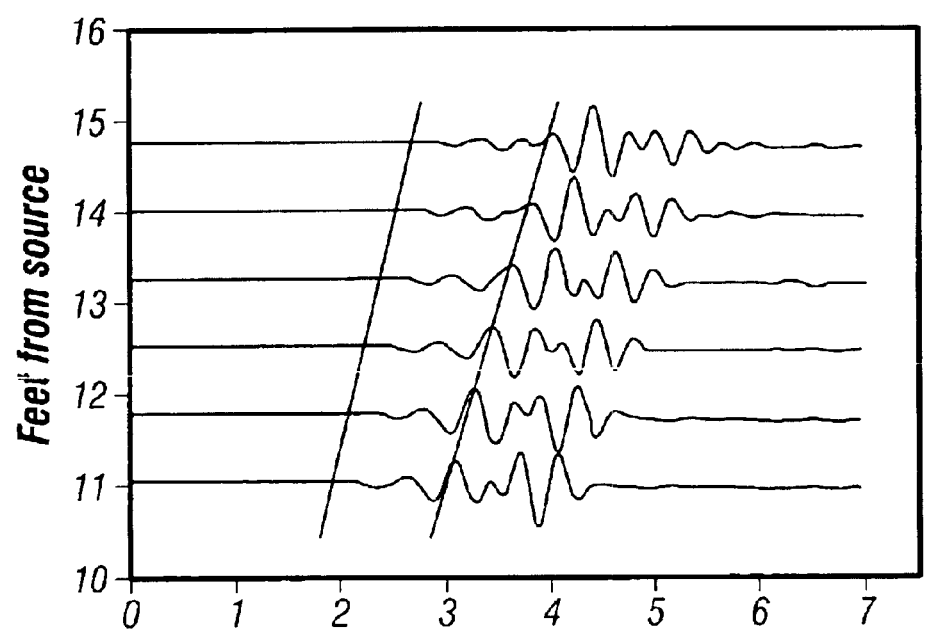

The quadrupole wave splitting is also observed for fast and intermediate TI formations. FIG. 19 shows the quadrupole waveforms for a horizontal well. All the above results indicate that the quadrupole wave splits into two arrivals in a TI formation at high deviation angles, regardless of the type of formation.

Figure 20A:
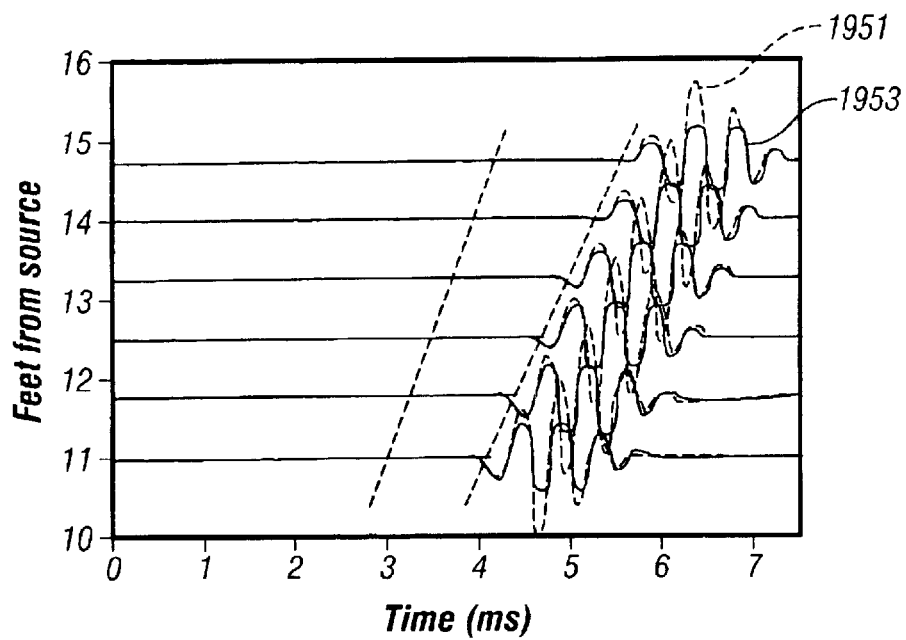
FIGS. 20a and 20b show the effects of transverse isotropy on array signals for two different toolface orientations.
Figure 20B:
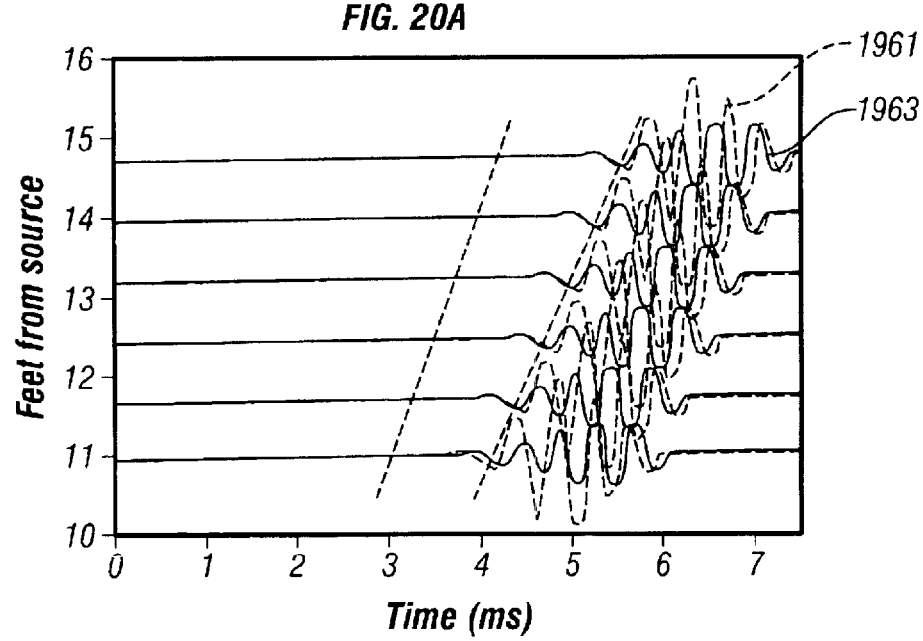
Figure 20C:
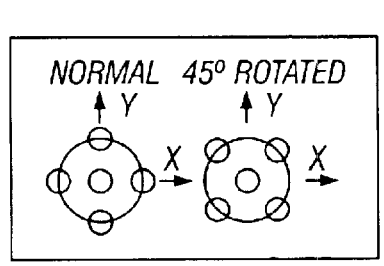
FIG. 20c shows the two different toolface orientations for the data of FIGS. 20a and 20b.

In a TI formation, the quadrupole measurement depends on the tool toolface direction in the borehole. Here, the toolface direction is defined as the angle at which the two positive (expanding) monopoles make to the x-axis. In the above, we have assumed the toolface angle is 0° degree (referred to as the normal quadrupole). This is shown in the left portion of FIG. 20c. The other important case is when the tool is rotated 45° about its axis. This shown in the right portion of FIG. 20c. For crossed dipoles, this rotation angle is 90°. FIG. 20a compares the waveforms for a 45°-quadrupole tool in the same slow TI formation as in FIG. 18. At low deviation angles (e.g., 30°), the waveforms are insensitive to the toolface angle. Compare 1951 to 1953. At high deviation angles (e.g., 60°), the waveforms strongly depend on the toolface angle, especially for the later arrival. Compare 1961 to 1963. The dependence on toolface angle of the waveforms at high deviation angles makes it possible to define the TI symmetry axis that is of practical importance.

Specifically, in one embodiment of the invention, the toolface angle is monitored, and acquisition of the quadrupole data is triggered when the toolface angle is close to a fixed value, such as 45°. It should be noted that acquisition may also be made at any integer multiple of 90° relative to the fixed value. The quadrupole data acquired in this fashion will provide a detectable difference between the fast and slow shear velocities of the formation, thus making possible the determination of azimuthal anisotropy magnitude and direction.

In an alternate embodiment of the invention, data are acquired without regard to the toolface angle. Following the acquisition, they are rotated to a fixed angle such as 45° using conventional rotation methods. The rotated data are then used for determination of azimuthal anisotropy magnitude and direction.

The above description has been made with respect to a LWD application of the invention. The present invention may also be used in Logging-while-Tripping. As would be known to those versed in the art, it is common for drillbits to wear out and the process of removing a drillstring for the purpose of changing a drill bit is called "tripping." Making measurements while tripping has the additional advantage that no drilling is being carried out, so that the signals received by the receivers of the present logging tool are not contaminated by drillbit generated noise.

While the foregoing disclosure is directed to the particular embodiments of the invention, various modifications will be apparent to those skilled in the art. It is intended that all variations within the scope and spirit of the appended claims be embraced by the foregoing disclosure.

What is claimed is:

1. A method of using an acoustic logging tool conveyed in a borehole in an earth formation for determining a characteristic of the formation, the method comprising:
   (a) using a source on said acoustic logging tool for generating a quadrupole wave in said earth formation;
   (b) determining a first slowness of said quadrupole wave from signals received by a plurality of receivers on said acoustic logging tool;
   (c) determining a formation shear wave velocity, $V_s$, from said first quadrupole-wave slowness and an estimated quadrupole-wave slowness, said estimated quadrupole-wave slowness based at least in part on an effective modulus of said logging tool.

2. The method of claim 1 further comprising obtaining additional parameters including:
   (i) a diameter of said borehole using a caliper,
   (ii) a density and acoustic velocity of a fluid in said borehole, and wherein determining said formation shear velocity is further based upon said additional parameters.

3. The method of claim 1 wherein determining said formation shear velocity further comprises using a weighted average spectral slowness for relating said first slowness to a dispersion relation of said quadrupole wave.

4. The method of claim 3 wherein said weighted average spectral slowness is given by an equation of the form $$\overline{S} = \frac{\int_{-\infty}^{\infty} S(\omega, V_S) \omega^2 A^2(\omega) d\omega}{\int_{-\infty}^{\infty} \omega^2 A^2(\omega) d\omega}$$

wherein $\overline{S}$ is said first slowness, $\omega$ is the angular frequency, and $S(\omega, V_s)$ is said dispersion relation of said quadrupole wave data as a function of angular frequency $\omega$ and said shear velocity $V_s$.

5. The method of claim 4 wherein determining said formation shear velocity further comprises adjusting a value of $V_f$ until the equation in claim 4 is satisfied.

6. The method of claim 1 wherein said formation is azimuthally anisotropic and said formation shear velocity is a slow shear velocity, the method further comprising:
   (i) obtaining array cross-dipole data; and
   (ii) determining a fast shear slowness of said formation from said slow shear velocity and said cross-dipole data.

7. The method of claim 6 wherein determining said fast shear velocity further comprises using an orientation sensor on said logging tool.

8. The method of claim 6 wherein determining said fast shear velocity further comprises rotating said cross-dipole data to a fixed coordinate system.

9. The method of claim 8 wherein said fixed coordinate system is selected from the group consisting of (I) an earth based coordinate system, and, (II) a formation based coordinate system.

10. The method of claim 8 further comprising determining a principal direction of anisotropy and rotating said cross-dipole data in said fixed coordinate system to a principal coordinate system.

11. The method of claim 6 further comprising using a weighted average spectral slowness for relating said fast shear wave slowness to a dispersion relation.

12. The method of claim 1 wherein said formation is azimuthally anisotropic, said first measured slowness is a slow quadrupole slowness, and said determined shear velocity is a slow shear velocity, the method further comprising:
   (i) determining a second quadrupole wave slowness; and
   (ii) determining a fast shear velocity.

13. The method of claim 1 further comprising operating said acoustic tool at a frequency of less than 3.0 kHz.

14. The method of claim 1 further comprising operating said tool near a central position of said borehole.

15. The method of claim 1 further comprising using a fluid in the borehole with a compressional velocity less than a shear velocity of said formation.

16. The method of claim 1 further comprising:
   (i) using an orientation device for determining a toolface angle of said acoustic tool during continued rotation of said acoustic tool; and
   (ii) using said determined toolface angle for activating said source on said acoustic logging tool when said toolface angle is substantially equal to a predetermined value.

17. The method of claim 16 further comprising determining a direction of TI symmetry of said earth formation.

18. An apparatus for use in a borehole in an earth formation for determining a characteristic of the formation, the apparatus comprising:
   (a) an acoustic tool on a bottom hole assembly (BHA), said acoustic tool having an acoustic source for propagating a quadrupole wave into said earth formation;

(b) a plurality of receivers on said acoustic tool for receiving said propagating quadrupole wave and producing signals indicative of said propagating quadrupole wave;

(c) a processor for determining from said signals and an effective modulus of said acoustic tool a formation shear wave velocity $V_s$.

19. The apparatus of claim 18 wherein said processor further determines a first slowness of said quadrupole wave.

20. The apparatus of claim 18 further comprising:
   (i) a caliper on said BHA for obtaining a diameter of said borehole, and
   (ii) a device for measuring a density and acoustic velocity of a fluid in said borehole.

21. The apparatus of claim 19 wherein said processor determines said formation shear velocity further comprises using a weighted average spectral slowness for relating said measured slowness to a dispersion relation of said array quadrupole data.

22. The apparatus of claim 21 wherein said weighted average spectral slowness is given by an equation of the form $$\overline{S} = \frac{\int_{-\infty}^{\infty} S(\omega, V_S)\omega^2 A^2(\omega) d\omega}{\int_{-\infty}^{\infty} \omega^2 A^2(\omega) d\omega}$$

wherein $\overline{S}$ is said measured slowness, $\omega$ is the angular frequency, and $S(\omega, V_s)$ is said dispersion relation of said quadrupole wave data as a function of angular frequency $\omega$ and said shear velocity Vs.

23. The apparatus of claim 22 wherein said processor determines said formation slowness by adjusting a value of $V_f$ until the equation in claim 23 is satisfied.

24. The apparatus of claim 18 wherein said formation is azimuthally anisotropic and said formation shear velocity is a slow shear velocity, the apparatus further comprising a source for producing dipole shear waves in said formation with a first polarization and a second polarization different from said first polarization, and wherein said processor determines a fast shear slowness of said formation from said slow shear velocity and signals received by acoustic receivers indicative of said dipole shear waves.

25. The apparatus of claim 24 further comprising an orientation sensor on BHA for determining a toolface orientation of said logging tool during continued rotation of said BHA.

26. The apparatus of claim 24 wherein said processor determines said fast shear velocity by rotating said shear waves with said first and second polarizations to a fixed coordinate system.

27. The apparatus of claim 26 wherein said fixed coordinate system is selected from the group consisting of (I) an earth based coordinate system, and, (II) a formation based coordinate system.

28. The apparatus of claim 26 wherein said processor further determines a principal direction of anisotropy and rotates said shear waves in said fixed coordinate system to a principal coordinate system.

29. The apparatus of claim 18 further comprising a conveyance device for conveying said BHA into said borehole, said conveyance device selected from the group consisting of (i) a drilling tubular, and, (ii) coiled tubing.

30. The apparatus of claim 18 wherein said acoustic tool is operated at a frequency of less than 3.0 kHz.

31. The apparatus of claim 20 wherein said tool is operated near a central position of said BHA in said borehole.

32. The apparatus of claim 18 further comprising an orientation device for determining a toolface angle of said acoustic tool during continued rotation of said acoustic tool, and wherein said processor uses said determined toolface angle for activating said source when said toolface angle is substantially equal to a predetermined value.

33. The apparatus of claim 32 wherein said processor further determines a direction of TI symmetry of said earth formation.

* * * * *